United States Patent
Ono et al.

(10) Patent No.: US 11,928,302 B2
(45) Date of Patent: Mar. 12, 2024

(54) TOUCH PANEL DEVICE

(71) Applicant: Mitsubishi Electric Corporation, Tokyo (JP)

(72) Inventors: Takeshi Ono, Tokyo (JP); Tae Orita, Tokyo (JP); Seiichiro Mori, Tokyo (JP); Yusuke Shimasaki, Tokyo (JP); Yuichi Sasaki, Tokyo (JP); Masaya Nidaira, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/636,376

(22) PCT Filed: Sep. 4, 2019

(86) PCT No.: PCT/JP2019/034690
§ 371 (c)(1),
(2) Date: Feb. 18, 2022

(87) PCT Pub. No.: WO2021/044537
PCT Pub. Date: Mar. 11, 2021

(65) Prior Publication Data
US 2022/0291784 A1    Sep. 15, 2022

(51) Int. Cl.
*G06F 3/044*    (2006.01)
*G06F 3/041*    (2006.01)

(52) U.S. Cl.
CPC ........ *G06F 3/0447* (2019.05); *G06F 3/04164* (2019.05); *G06F 3/0445* (2019.05);
(Continued)

(58) Field of Classification Search
CPC .............. G06F 3/0447; G06F 3/04164; G06F 2203/04103; G06F 2203/04105; G06F 3/0445; G06F 3/0446
See application file for complete search history.

(56) References Cited

U.S. PATENT DOCUMENTS

2011/0018826 A1    1/2011 Shoji
2011/0157087 A1    6/2011 Kanehira et al.
(Continued)

FOREIGN PATENT DOCUMENTS

JP    2011-28476 A    2/2011
JP    2011-100364 A    5/2011
(Continued)

OTHER PUBLICATIONS

International Search Report and Written Opinion dated Oct. 15, 2019, received for PCT Application PCT/JP2019/034690, Filed on Sep. 4, 2019, 12 pages including English Translation.
(Continued)

*Primary Examiner* — Patrick N Edouard
*Assistant Examiner* — Joseph P Fox
(74) *Attorney, Agent, or Firm* — XSENSUS LLP

(57) ABSTRACT

A touch panel device includes a cover panel having a front surface including an operation region on which a touch operation is performed and a back surface as a surface on a side opposite to the front surface, a first adhesive material provided on the back surface, a touch panel unit that includes a base substrate and a plurality of touch sensor electrodes provided on a region of the base substrate corresponding to the operation region and is arranged to face the back surface via the first adhesive material, a first displacement detection electrode provided on a part of the back surface outside a region of the back surface corresponding to the operation region, and a second displacement detection electrode provided on a part of the base substrate outside the region of the base substrate corresponding to the operation region to face the first displacement detection electrode.

15 Claims, 19 Drawing Sheets

(52) U.S. Cl.
CPC .. *G06F 3/0446* (2019.05); *G06F 2203/04103* (2013.01); *G06F 2203/04105* (2013.01)

(56) References Cited

U.S. PATENT DOCUMENTS

| | | |
|---|---|---|
| 2011/0175845 A1 | 7/2011 | Honda et al. |
| 2013/0242485 A1 | 9/2013 | Ohtani et al. |
| 2016/0062500 A1* | 3/2016 | Kessler ................ G06F 3/0447 345/173 |
| 2016/0299598 A1 | 10/2016 | Yoon et al. |
| 2017/0024038 A1 | 1/2017 | Noguchi et al. |

FOREIGN PATENT DOCUMENTS

| | | |
|---|---|---|
| JP | 2012-103761 A | 5/2012 |
| JP | 2014-202618 A | 10/2014 |
| JP | 2015-168601 A | 9/2015 |
| JP | 2016-201113 A | 12/2016 |
| JP | 2017-27576 A | 2/2017 |
| JP | 2018-18237 A | 2/2018 |
| WO | 2000/044018 A1 | 7/2000 |
| WO | 2010/106759 A1 | 9/2010 |

OTHER PUBLICATIONS

Notice of Reasons for Refusal dated Mar. 10, 2020, received for Japanese Application 2019-568415, 10 pages Including English Translation.

Decision of Refusal dated Jun. 16, 2020, received for Japanese Application 2019-568415, 8 pages including English Translation.

* cited by examiner

TOUCH PANEL DEVICE

CROSS-REFERENCE TO RELATED APPLICATION

The present application is based on PCT filing PCT/JP2019/034690, filed Sep. 4, 2019, the entire contents of which is incorporated herein by reference.

TECHNICAL FIELD

The present invention relates to a touch panel device.

BACKGROUND ART

There has been proposed a touch panel device of a projected capacitive type that detects a touch position based on a change in capacitance between touch sensor electrodes that occurs due to a touch operation performed by using an electric conductor such as a finger. See, for example, Patent Reference 1. In the touch panel device of this type, a cover panel having an operation surface on which the touch operation is performed can be formed of a robust protective plate such as tempered glass approximately several millimeters thick.

Furthermore, there has been proposed a touch panel device having a function of detecting the touch position and pressing force by detecting the change in the capacitance between the touch sensor electrodes that occurs when the pressing force is applied to a transparent protective film by the touch operation. See, for example, Patent Reference 2.

PRIOR ART REFERENCE

Patent Reference

Patent Reference 1: Japanese Patent Application Publication No. 2012-103761
Patent Reference 2: Japanese Patent Application Publication No. 2011-028476

SUMMARY OF THE INVENTION

Problem to be Solved by the Invention

In the touch panel device described in the Patent Reference 1, the cover panel can be formed of a robust protective plate. However, it is difficult in this case to provide the touch panel device with the function of detecting the pressing force.

In the touch panel device described in the Patent Reference 2, the pressing force is detected based on a change in distance between the touch sensor electrodes in an operation region, and thus the transparent protective film cannot be replaced with a cover panel formed of a robust protective plate.

An object of the present invention, which has been made to resolve the above-described problems, is to provide a touch panel device having the cover panel and capable of detecting the touch position and the pressing force.

Means for Solving the Problem

A touch panel device according to an aspect of the present invention includes a cover panel having a front surface including an operation region on which a touch operation is performed and a back surface as a surface on a side opposite to the front surface, a first adhesive material provided on the back surface, a touch panel unit that includes a base substrate and a plurality of touch sensor electrodes provided on a region of the base substrate corresponding to the operation region and is arranged to face the back surface via the first adhesive material, a first displacement detection electrode provided on a part of the back surface outside a region of the back surface corresponding to the operation region, and a second displacement detection electrode provided on a part of the base substrate outside the region of the base substrate corresponding to the operation region to face the first displacement detection electrode.

Effect of the Invention

According to the present invention, a touch panel device having the cover panel and capable of detecting the touch position and the pressing force can be provided.

MEANS FOR CARRYING OUT THE INVENTION

Touch panel devices according to embodiments of the present invention will be described below with reference to the drawings. The touch panel devices according to the embodiments are capable of detecting the position (i.e., coordinates) of the touch operation performed by using an indicator being an electric conductor and the pressing force applied by the touch operation even though the surface on which the touch operation is performed is formed by a cover panel that is formed of hard glass or the like. The following embodiments are just examples and a variety of modifications are possible within the scope of the present invention.

(1) First Embodiment

Figure 1:
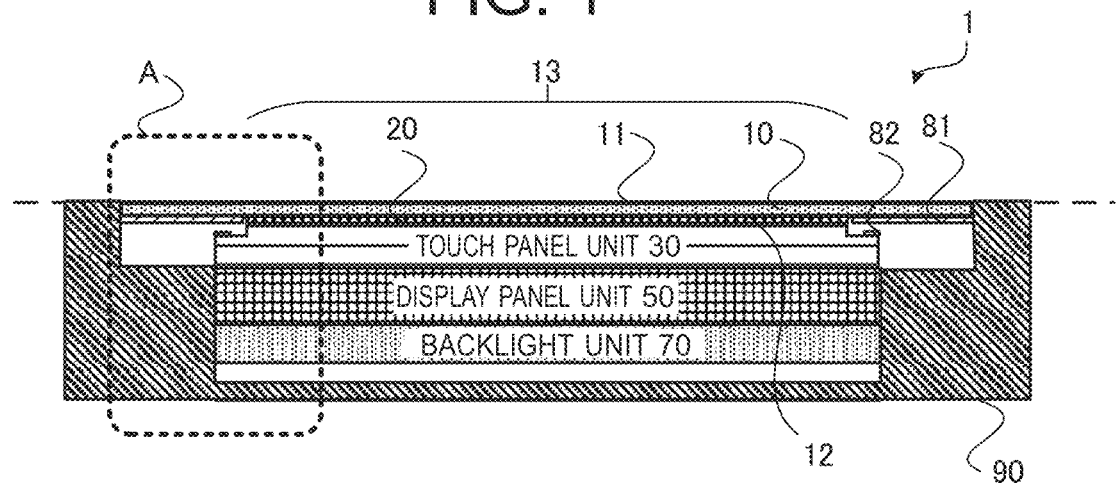
FIG. 1 is a cross-sectional view schematically showing the structure of a touch panel device according to a first embodiment of the present invention.
Figure 2:
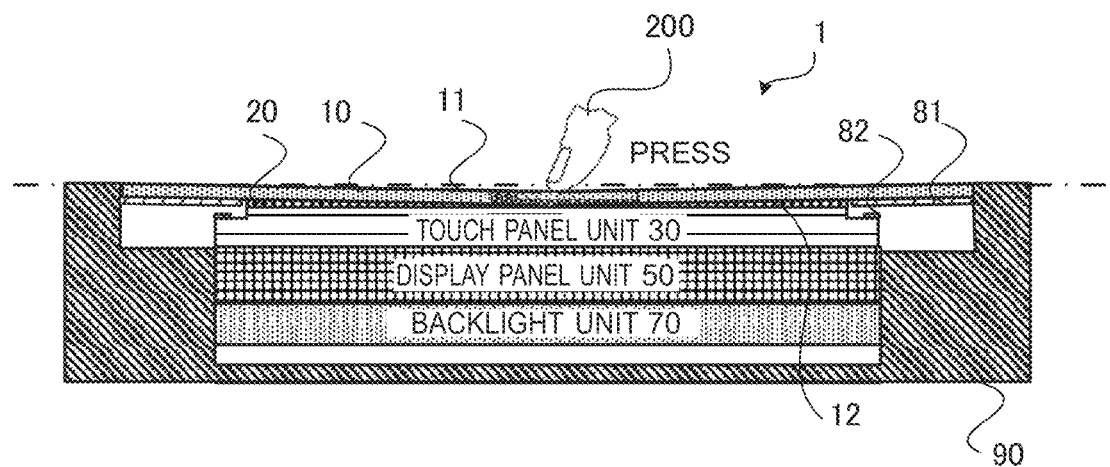
FIG. 2 is a cross-sectional view schematically showing the state of a cover panel when a position in the vicinity of a central position of the cover panel of the touch panel device according to the first embodiment is pressed.
Figure 3:
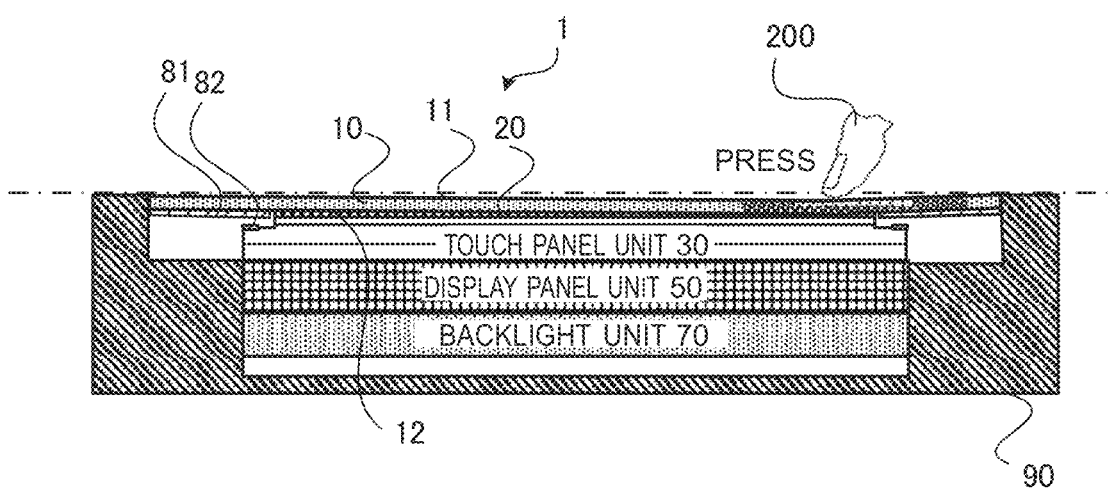
FIG. 3 is a cross-sectional view schematically showing the state of the cover panel when a position in the vicinity of a corner of the cover panel of the touch panel device according to the first embodiment is pressed.

FIG. 1 is a cross-sectional view schematically showing the structure of a touch panel device 1 according to a first embodiment. FIG. 2 is a cross-sectional view schematically showing the state of a cover panel 10 when a position in the vicinity of a central position of the cover panel 10 of the touch panel device 1 is pressed. FIG. 3 is a cross-sectional view schematically showing the state of the cover panel 10 when a position in the vicinity of a corner of the cover panel 10 of the touch panel device 1 is pressed. In the touch panel device 1, a housing 90 supports a touch panel unit 30 or a display panel unit 50.

The touch panel device 1 includes the cover panel 10 having a front surface 11 including an operation region (referred to also as a "display region") 13 on which the touch operation is performed and a back surface 12 as the surface on the side opposite to the front surface 11, an adhesive material 20 as a first adhesive material provided on the back surface 12, the touch panel unit 30 arranged to face the back surface 12 via the adhesive material 20, a first displacement detection electrode 81 provided on a part of the back surface 12 outside a region of the back surface 12 corresponding to the operation region 13, and a second displacement detection electrode 82 facing the first displacement detection electrode 81.

The cover panel 10 is a hard glass panel, for example. Being hard means a quality of not being locally depressed only at the pressed part by the pressing. Furthermore, the whole of the cover panel 10 is curved by the pressing. The cover panel 10 may also be formed of a material other than glass. The adhesive material 20 is an adhesive agent, for example. The adhesive material 20 is a member that is elastically deformed, for example.

The touch panel unit 30 is a touch panel of the electrostatic capacitance type, for example. The touch panel unit 30 includes a plurality of touch sensor electrodes. When the touch operation is performed inside the operation region 13 of the front surface 11 of the cover panel 10 by using the indicator (e.g., finger 200) being an electric conductor, the capacitance between touch sensor electrodes at the touch position receiving the touch operation among the plurality of touch sensor electrodes (referred to also as "first capacitance") changes.

The first displacement detection electrode 81 and the second displacement detection electrode 82 are pressure sensor electrodes for detecting the pressing force applied by the touch operation. As shown in FIG. 2, when a position in the vicinity of the central position of the cover panel 10 is pressed, the vicinity of the central position of the cover panel 10 lowers towards the adhesive material 20 and the whole of the cover panel 10 is curved. At that time, the distance between the first displacement detection electrode 81 and the second displacement detection electrode 82 changes (e.g., decreases) and the capacitance between the first displacement detection electrode 81 and the second displacement detection electrode 82 (referred to also as second capacitance) changes.

Furthermore, the touch panel device 1 includes the display panel unit 50 that displays an image that is visible through the touch panel unit 30, the adhesive material 20 and the cover panel 10. The display panel unit 50 is a liquid crystal panel unit including a liquid crystal display, for example. In the case where the display panel unit 50 is a liquid crystal panel unit, the touch panel device 1 may include a backlight unit 70.

Figure 4:
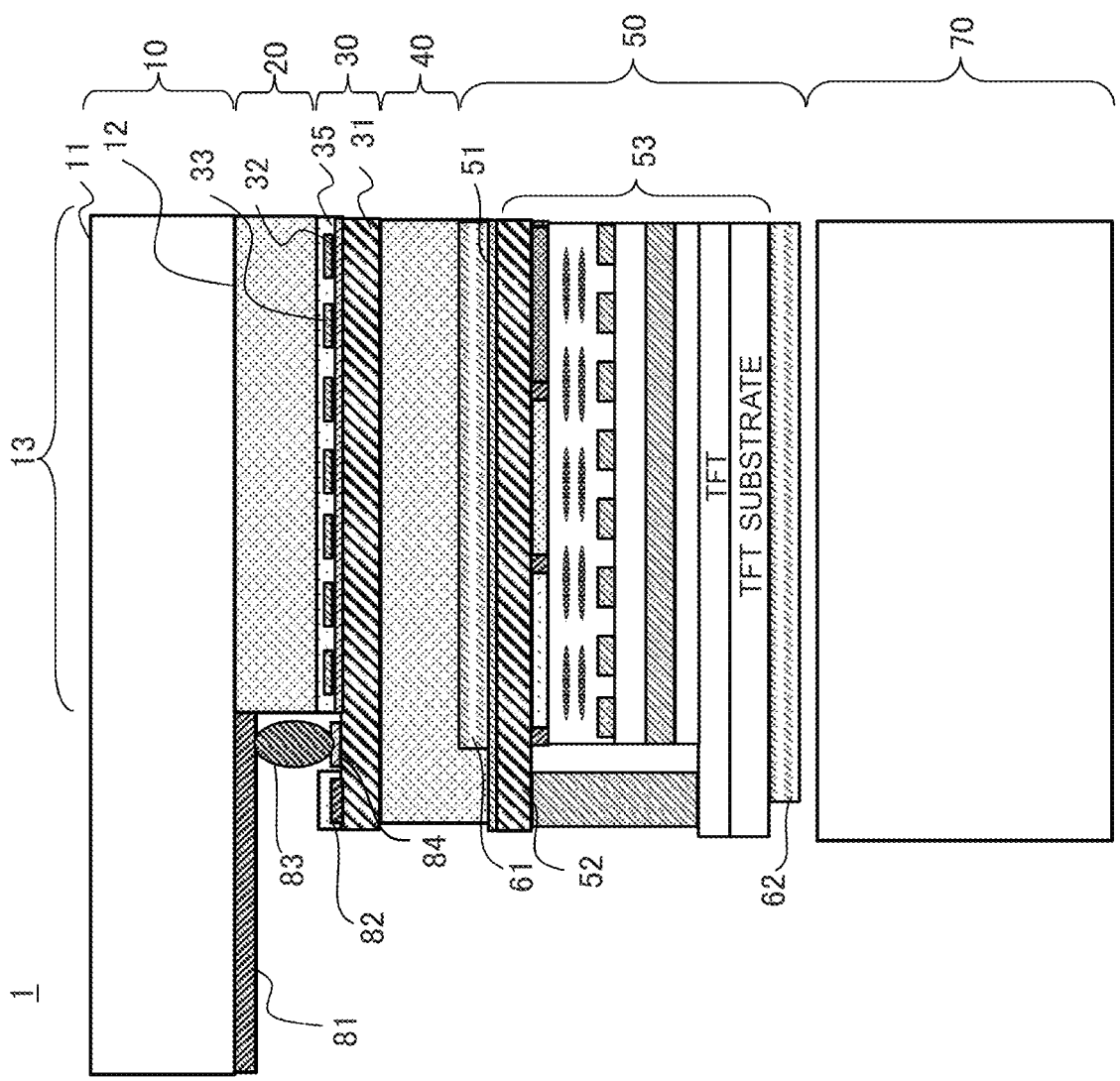
FIG. 4 is a cross-sectional view schematically showing the structure of a part of the touch panel device according to the first embodiment corresponding to the part A in FIG. 1.
Figure 5:
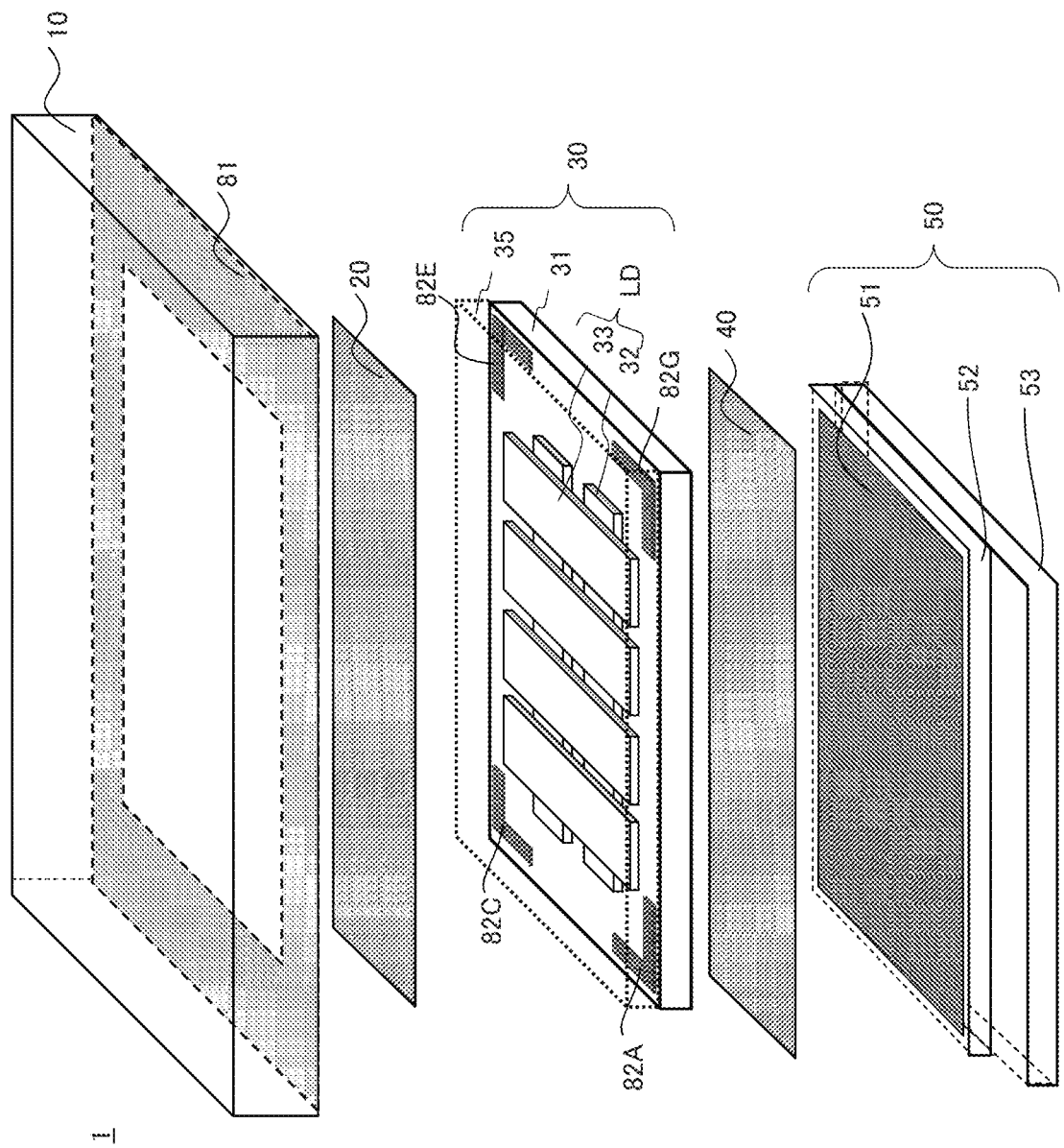
FIG. 5 is an exploded perspective view showing the structure of the touch panel device according to the first embodiment in a simplified form.
Figure 6:
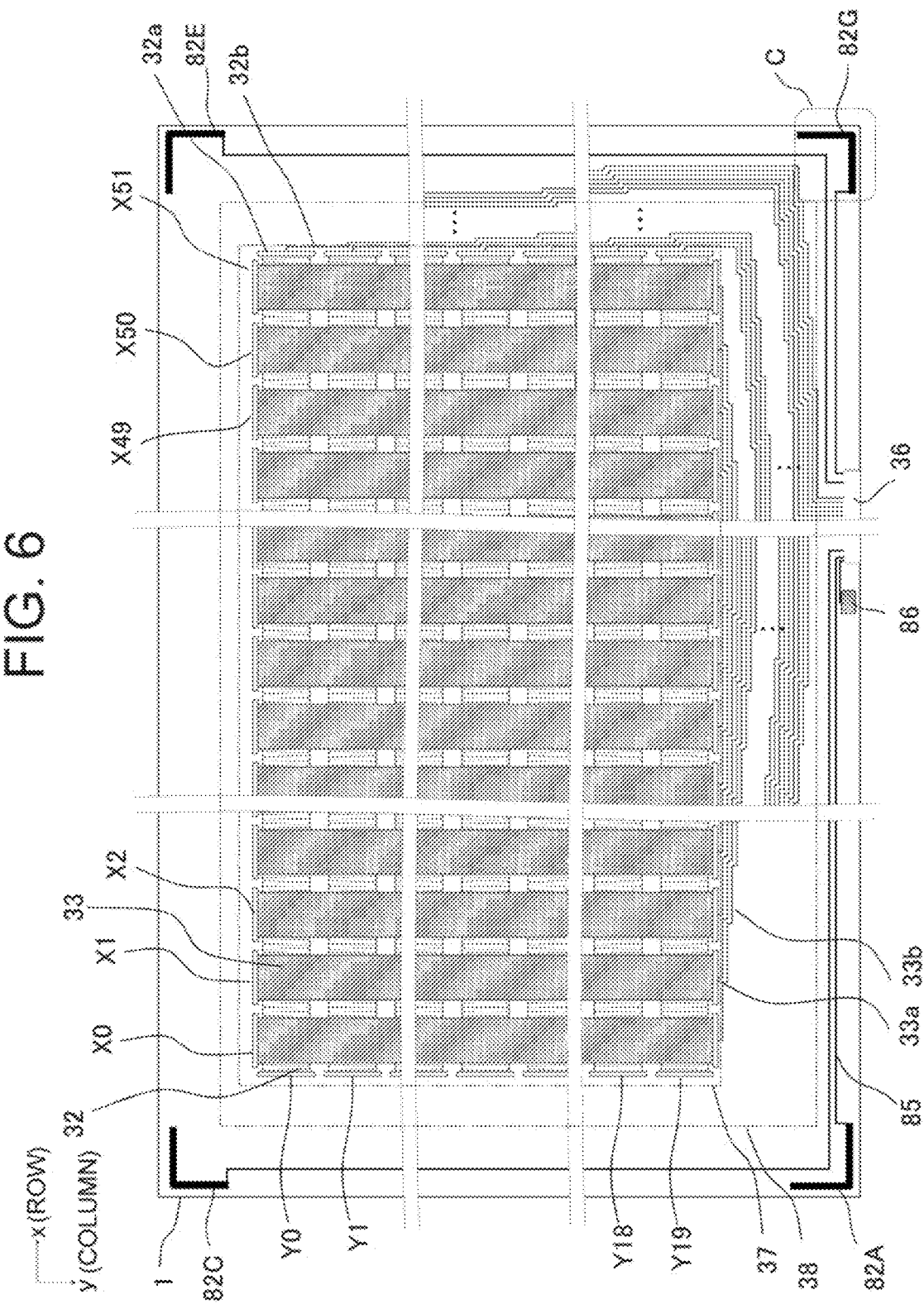
FIG. 6 is a plan view schematically showing the structure of a touch panel unit of the touch panel device according to the first embodiment.
Figure 7A:
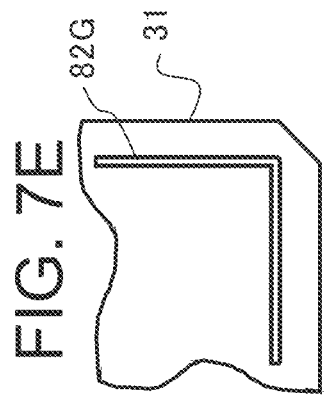
FIGS. 7A to 7G are enlarged plan views schematically showing other examples of the structure of the part C in FIG. 6.
Figure 7D:
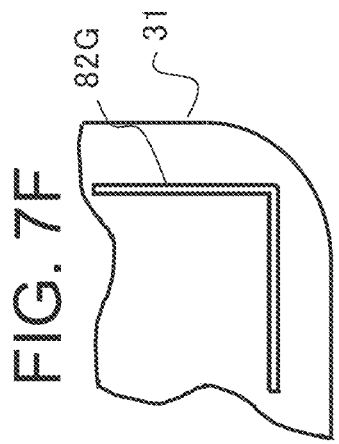
Figure 7E:
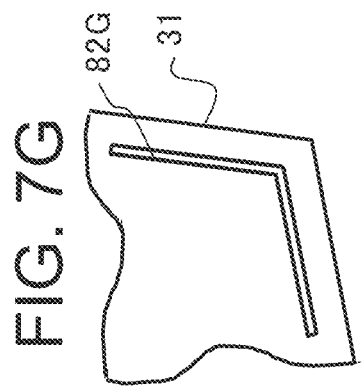
Figure 7B:
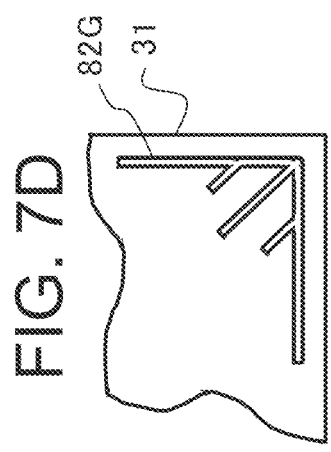
Figure 7F:
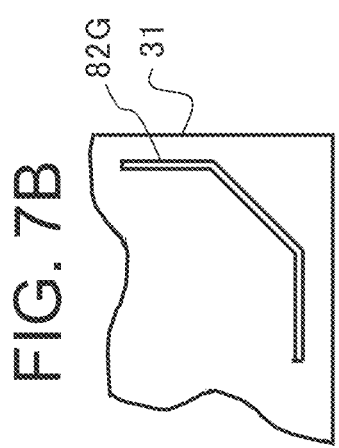
Figure 7C:
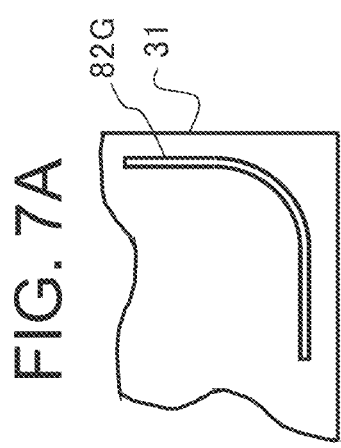
Figure 7G:
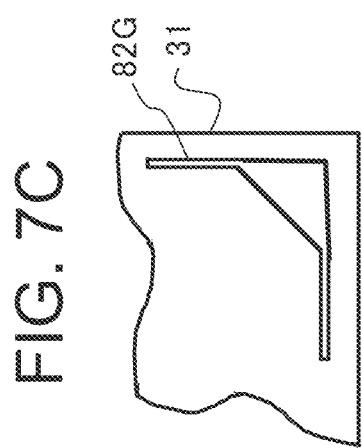

FIG. 4 is a cross-sectional view schematically showing the structure of a part of the touch panel device 1 corresponding to the part A in FIG. 1. FIG. 5 is an exploded perspective view showing the structure of the touch panel device 1 in a simplified form. FIG. 6 is a plan view schematically showing the structure of the touch panel unit 30 of the touch panel device 1. Items 51, 52, 61, and 62 denote examples of components of the display unit 50.

In the first embodiment, while the cover panel 10 allows light to pass through in the operation region 13 of the touch panel device 1, a region outside the operation region 13 is normally printed on with black color in consideration of design. In the first embodiment, the operation region 13 of the touch panel device 1 corresponds to the operation region 13 of the front surface of the cover panel 10. The first displacement detection electrode 81 is formed by the printing with an electrically conductive carbon paste, for example. In this case, a black print region is formed by the cover panel 10. By this method, the number of steps in the manufacture can be decreased compared to the method in which the formation of the black print and the formation of the first displacement detection electrode 81 are executed separately from each other. Furthermore, since the first displacement detection electrode 81 is formed outside the operation region 13, an increase in reflectance of light and a decrease in transmittance of light in the operation region 13 can be inhibited.

Furthermore, in the first embodiment, the touch panel unit 30 is formed by a touch position detection layer LD and a base substrate 31 supporting the touch position detection layer LD. The base substrate 31 is transparent and is formed of glass or resin, for example. The touch panel unit 30 is joined to an inner surface of the cover panel 10 via the adhesive material 20 so that the touch position detection layer LD is situated between the cover panel 10 and the base substrate 31. Thus, the touch position detection layer LD is provided indirectly on the inner surface of the cover panel 10 via the adhesive material 20. Incidentally, the touch position detection layer LD may be covered by a protective film 35 and thereby protected.

Furthermore, the first displacement detection electrode 81 is electrically connected via a transfer electrode 83 to a contact part 84 formed on the base substrate 31. When an electric signal is inputted to the first displacement detection electrode 81 from the outside, connection to the outside through wiring in a flexible printed circuit board (FPC) is possible. By electrically connecting the first displacement detection electrode 81 to the base substrate 31 as in the first embodiment, the cost for the members can be reduced since it is unnecessary to mount an FPC specially for the cover panel 10.

In order to achieve the detection of the position of the touch operation by the projected capacitive method, the touch position detection layer LD includes a plurality of column electrodes 32, a plurality of row electrodes 33, and an interlayer insulation film (not shown). The interlayer insulation film is situated between the column electrodes 32 and the row electrodes 33 in a thickness direction and insulates the space between the column electrodes 32 and the row electrodes 33. In other words, the interlayer insulation film is provided between the column electrodes 32 and the row electrodes 33 in parts where a column electrode 32 and a row electrode 33 overlap with each other in a plan view. In a detection region 37 shown in FIG. 6, the plurality of column electrodes 32 extend in parallel with each other, and the plurality of row electrodes 33 extend in parallel with each other. The plurality of row electrodes 33 and the plurality of column electrodes 32 intersect with each other. In other words, each of the row electrodes 33 intersects with the plurality of column electrodes 32, and each of the column electrodes 32 intersects with the plurality of row electrodes 33.

As shown in FIG. 6, the plurality of column electrodes 32 include 52 columns of column electrodes X0-X51, for example. The plurality of row electrodes 33 include 20 rows of row electrodes Y0-Y19, for example. The number of the plurality of column electrodes 32 is not limited to 52. The number of the plurality of row electrodes 33 is not limited to 20. Each of the column electrodes 32 is connected to a column terminal 32a. Each column terminal 32a is connected to an external terminal part 86 by a lead wire 32b. Each of the row electrodes 33 is connected to a row terminal 33a. Each row terminal 33a is connected to the external terminal part 86 or 36 by a lead wire 33b.

Furthermore, four corner vicinal regions of the base substrate 31 outside the outline 38 (FIG. 6) of the adhesive material 20 are respectively provided with the second displacement detection electrodes 82 (i.e., 82A, 82C, 82E and 82G) formed simultaneously with the column electrodes 32. The second displacement detection electrodes 82A, 82C, 82E and 82G are referred to also as corner electrode parts. Each of the second displacement detection electrodes 82 is connected to the external terminal part 86 by a lead wire 85. Incidentally, the second displacement detection electrodes 82 may also be formed simultaneously with not the column electrodes 32 but the row electrodes 33.

By arranging the second displacement detection electrodes 82 and their respective lead wires 85 to be electrically separate from the column electrodes 32 and the row electrodes 33 as above, the detection of the touch position and the detection of the pressing force can be executed independently of each other. Furthermore, since the connections of the second displacement detection electrodes 82A, 82C, 82E and 82G are also made independently of each other by the lead wires 85, a detection value can be obtained from each of the electrodes, and thus the detection sensitivity can be increased by making it possible to select a maximum detection value at the time of the pressing.

The second displacement detection electrode 82 is situated at a position to face the first displacement detection electrode 81, and the first displacement detection electrode 81 is larger than the second displacement detection electrode 82 in a plan view and is arranged to totally cover the second displacement detection electrode 82. In a plan view means in a case where the front surface 11 is viewed from the front. With this configuration, capacitance formed between the electrically conductive indicator and the second displacement detection electrode 82 when the indicator comes close to a top surface of the cover panel 10 is shielded by the first displacement detection electrode 81. Consequently, capacitance connected to the second displacement detection electrode 82 is not influenced by the approach of an electric conductor. Therefore, the capacitance connected to the second displacement detection electrode 82 can be made to change corresponding to the change in the distance between the first displacement detection electrode 81 and the second displacement detection electrode 82.

Furthermore, since the second displacement detection electrode 82 is formed outside the outline 38 of the adhesive material 20, an air layer is formed between the first displacement detection electrode 81 and the second displacement detection electrode 82. With this configuration, a difference (i.e., deformation amount difference) can be caused between a deformation amount of the cover panel 10 and a deformation amount of the base substrate 31 when the front surface (i.e., top surface) 11 of the cover panel 10 is pressed with the indicator as will be described later.

FIGS. 7A to 7G are enlarged plan views schematically showing other examples of the structure of the part C in FIG. 6. The shape of the corner electrode 82 does not necessarily have to be a shape including two straight line parts arranged orthogonally and connected to each other. For example, the shape of the corner electrode 82 can be a shape including a curved line part (i.e., arc-like part) and straight line parts like that shown in FIG. 7A, a shape including three or more straight line parts connected to each other like that shown in FIG. 7B, a shape in which the thickness of each line segment varies partially (i.e., a shape in which the width of each line segment is wide in the vicinity of a corner of a rectangle) like that shown in FIG. 7C, a shape including two straight line parts and line segment parts branching from these straight line parts like that shown in FIG. 7D, or the like. The shape of the corner electrode 82 can also be a shape having a structure as a combination of two or more of FIGS. 7A to 7D.

Furthermore, a corner part of the base substrate 31 does not necessarily have to be in a shape like an orthogonal corner of a rectangle. For example, the corner part of the base substrate 31 can be in a shape including three or more linear sides like that shown in FIG. 7E, a shape including a side like a curved line (i.e., a side like an arc) like that shown in FIG. 7F, a shape in which two linear sides intersect at an angle other than 90 degrees like that shown in FIG. 7G, or the like.

Furthermore, the shape of the base substrate 31 in a plan view can also be a shape other than a quadrangle, such as a polygon other than a quadrangle. In this case, the corner part of the base substrate 31 can also be in a shape having a structure as a combination of two or more of FIGS. 7E to 7G. However, in a case where the shape of the base substrate 31 in a plan view is a circular shape or an elliptical shape, the corner electrode 82 is arranged somewhere in a space outside the outline 38 of the adhesive material 20.

In the first embodiment, the column electrodes 32, the row electrodes 33 and the second displacement detection electrodes 82 are formed of a transparent electric conductor, for example, the second displacement detection electrodes 82 are formed of ITO (Indium Tin Oxide). The interlayer insulation film between the column electrodes 32 and the row electrodes 33 is desired to be a transparent film, such as a silicon nitride film, a silicon dioxide film or an organic film.

Furthermore, the lead wires 32b, 33b and 85 are formed of a low-resistance material made of aluminum alloy. The lead wires 32b, 33b and 85 may also be formed of a low-resistance material such as copper alloy, silver alloy or the like instead of aluminum alloy.

The display panel unit 50 is joined to the touch panel unit 30 in the thickness direction (i.e., vertical direction in FIG. 4) via an adhesive material 40 as a second adhesive material. Furthermore, the backlight unit 70 is attached to the display panel unit 50.

Figure 8:
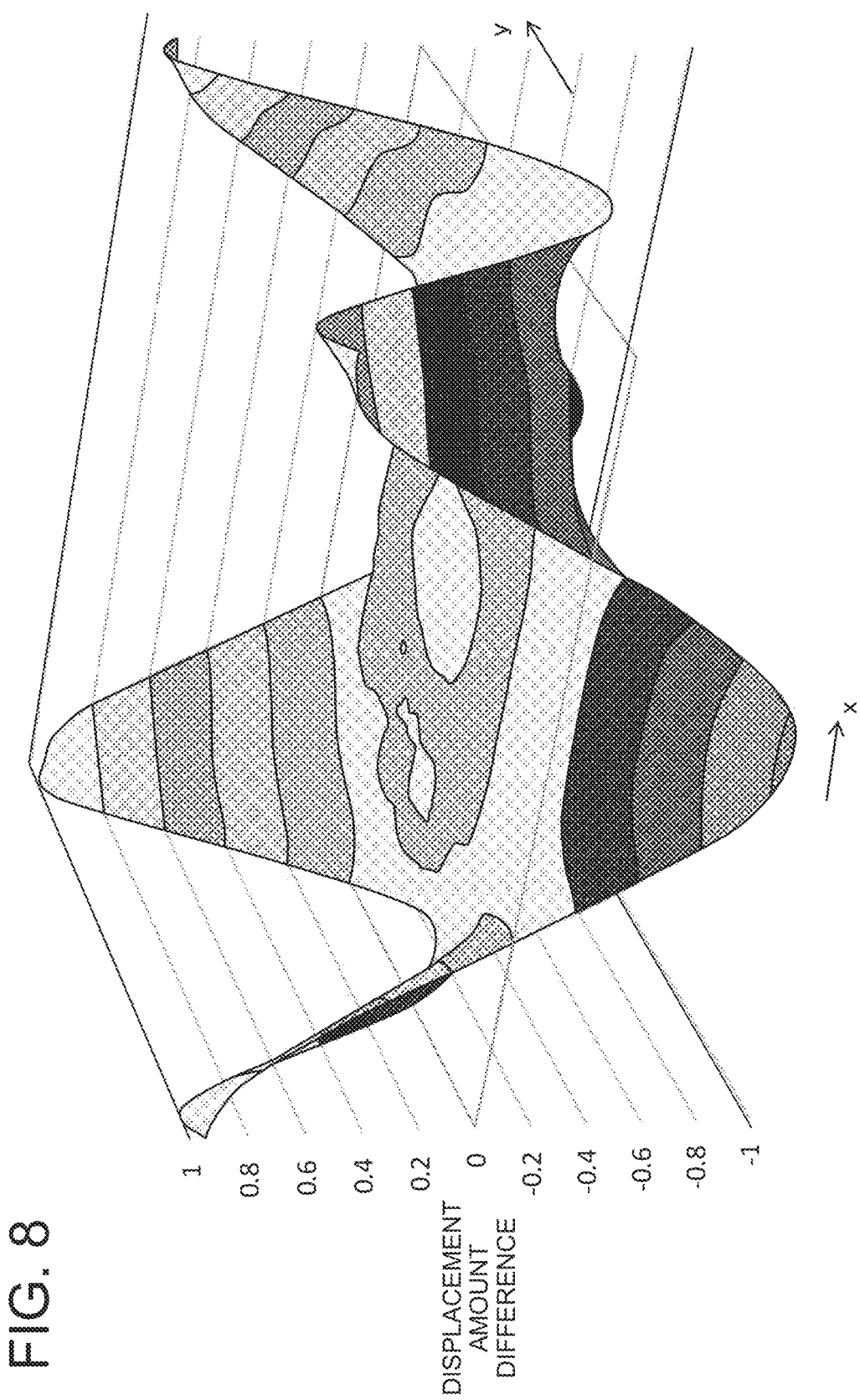
FIG. 8 is a diagram showing displacement of the cover panel when a position in the vicinity of the central position of the cover panel of the touch panel device according to the first embodiment is pressed.
Figure 9:
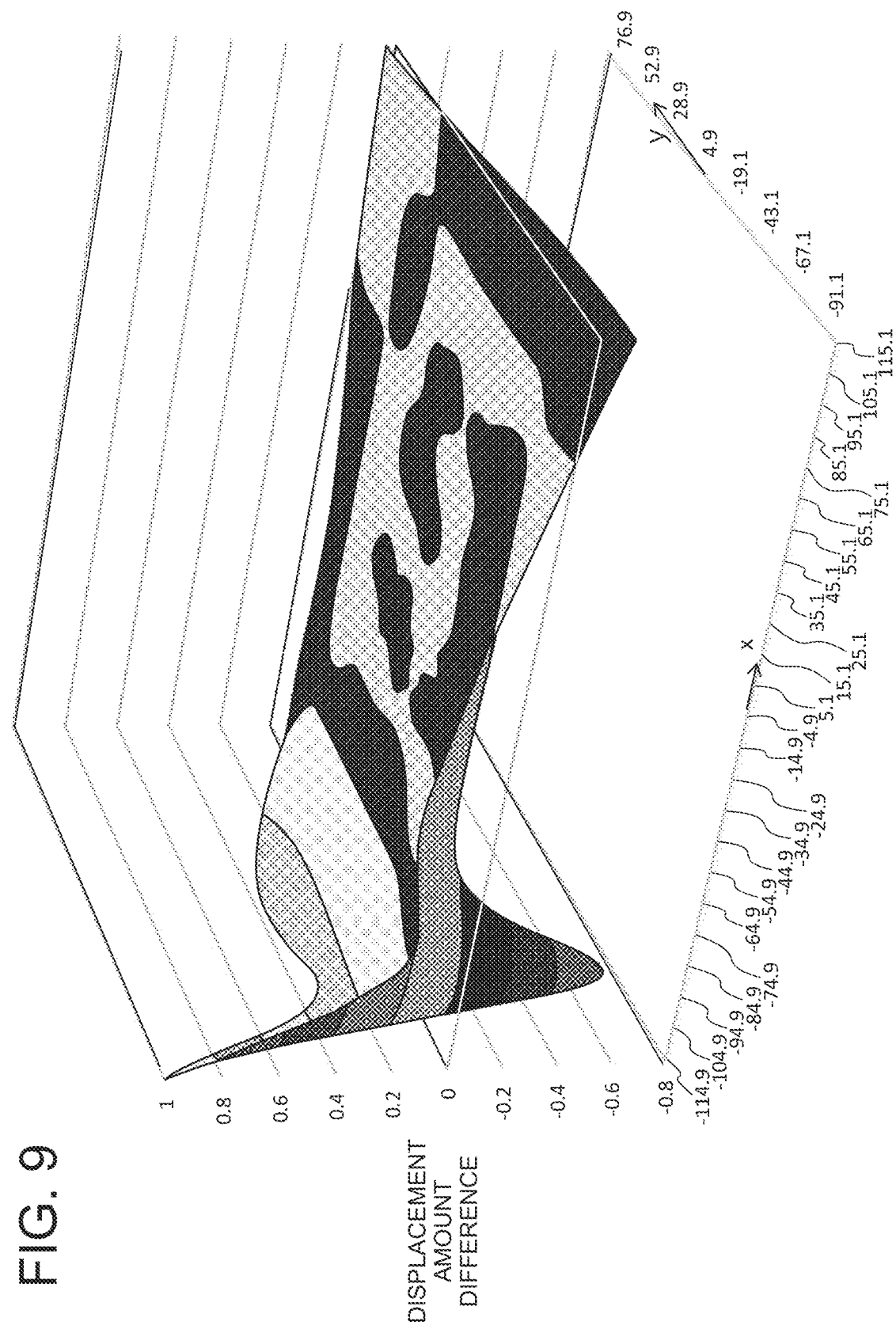
FIG. 9 is a diagram showing the displacement of the cover panel when a position in the vicinity of a corner of the cover panel of the touch panel device according to the first embodiment is pressed.

FIG. 8 is a diagram showing the displacement of the cover panel 10 when a position in the vicinity of the central position of the cover panel 10 of the touch panel device 1 is pressed. FIG. 9 is a diagram showing the displacement of the cover panel 10 when a position in the vicinity of a corner of the cover panel 10 of the touch panel device 1 is pressed. The deformation amount difference between the deformation of the cover panel 10 and the deformation of the base substrate 31 when the top surface of the cover panel 10 is pressed with the indicator will be described below with reference to FIG. 8 and FIG. 9. When the top of the cover panel 10 is pressed with the indicator, the cover panel 10 and the base substrate 31 are deformed, and a difference (i.e., the deformation amount difference) occurs between the deformation amount of the cover panel 10 and the deformation amount of the base substrate 31. FIG. 8 and FIG. 9 show results of calculating the deformation amounts by using stress simulation. The stress simulation was performed assuming that the thickness of the cover panel 10 is 2.0 mm, the thickness of the base substrate 31 is 0.7 mm, and the total thickness of the display panel unit 50 is 1.5 mm.

FIG. 8 shows the distribution of the deformation amount difference between the deformation amount of the cover panel 10 and the deformation amount of the base substrate 31 when the pressing force of 1 N/cm$^2$ is applied to the central position on the cover panel 10 by the indicator of 8 mm in diameter. The X-axis and the Y-axis of the graph of FIG. 8 represent coordinates on the base substrate 31, and on the Z-axis of the graph, positive values indicate that the deformation of the cover panel 10 is greater than that of the base substrate 31 and negative values indicate the opposite. The Z-axis of the graph indicates values as relative values by using 1 as the maximum value among positive values.

As shown in FIG. 8, it can be seen that the deformation amount difference occurs in the positive direction in the four corner vicinal regions of the base substrate 31. This indicates that the distance between the cover panel 10 and the base substrate 31 increases due to the pressing.

FIG. 9 shows the distribution of the deformation amount difference as the difference between the deformation amount of the cover panel 10 and the deformation amount of the base substrate 31 when the pressing force of 1 N/cm$^2$ is applied to a region on the cover panel 10 in the vicinity of a corner of the operation region 13 by the indicator of 8 mm in diameter. As shown in FIG. 9, it can be seen that the deformation amount difference occurs in the positive direction in one corner vicinal region of the base substrate 31 in the vicinity of the pressed part. This indicates that the distance between the cover panel 10 and the base substrate 31 increases due to the pressing similarly to the case of FIG. 8.

These deformation amount differences occur as the result of a situation where binding force on the cover panel 10 caused by the adhesion of the adhesive material 20 weakens in a region of the base substrate 31 outside the adhesive material 20. Furthermore, in the first embodiment, the first displacement detection electrode 81 and the second displacement detection electrode 82 are provided outside the adhesive material 20, which makes it possible to detect the deformation amount difference between the deformation amount of the cover panel 10 and the deformation amount of the base substrate 31 as a change in the capacitance. Furthermore, since the deformation amount difference occurs at one or all of the four corners of the base substrate 31 as shown in FIG. 8 and FIG. 9 when the operation region 13 is pressed with the indicator, detecting the pressing force irrespective of what point in the operation region 13 is pressed is made possible by forming the second displacement detection electrode 82 in the four corner vicinal regions on the base substrate 31 as shown in the first embodiment. It is also possible to presume a case where the pressing force is detected when only a certain particular operation region 13 is pressed, and in such a case, a wide pressing force detection range can be secured with a small number of electrodes by forming the second displacement detection electrode 82 in at least one of the four corner vicinal regions.

Figure 10:
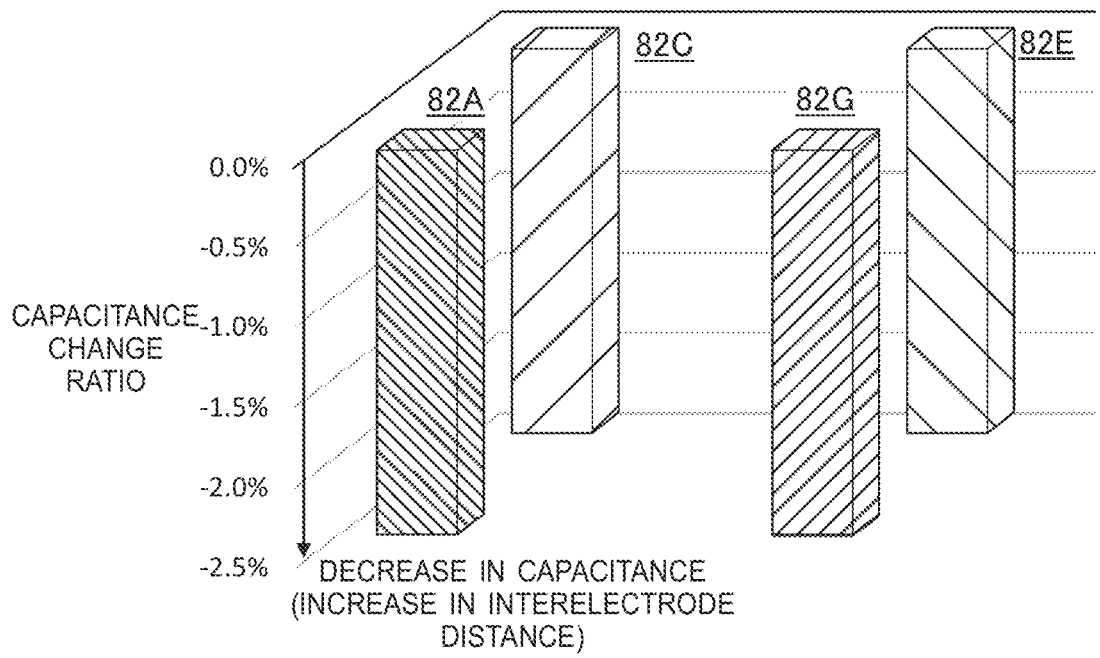
FIG. 10 is a graph showing a ratio of change of capacitance between a first displacement detection electrode and a second displacement detection electrode when a position in the vicinity of the central position of the cover panel of the touch panel device according to the first embodiment is pressed.
Figure 11:
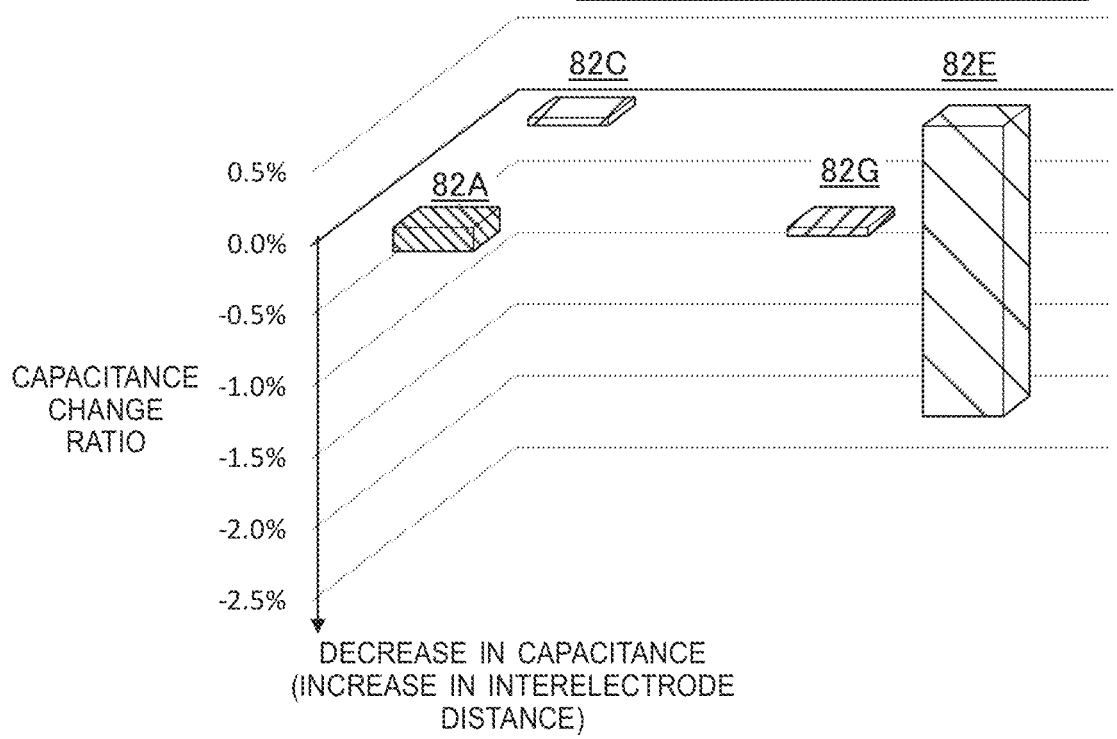
FIG. 11 is a graph showing the ratio of change of the capacitance between the first displacement detection electrode and the second displacement detection electrode when a position in the vicinity of a corner of the cover panel of the touch panel device according to the first embodiment is pressed.

The capacitance change occurring between the first displacement detection electrode 81 and the second displacement detection electrode 82 when the top surface of the cover panel 10 in the first embodiment is pressed with the indicator will be described below with reference to FIG. 10 and FIG. 11. FIG. 10 and FIG. 11 show results of calculation of the capacitance changes caused by the deformation amount differences shown in FIG. 8 and FIG. 9.

FIG. 10 shows a ratio of the capacitance change occurring between the first displacement detection electrode 81 and the second displacement detection electrode 82 when the pressing force of 1 N/cm$^2$ is applied to the central position of the cover panel 10 by the indicator of 8 mm in diameter in regard to each of the four second displacement detection electrodes 82A, 82C, 82E, 82G. On the Z-axis of the graph, positive values indicate that the capacitance increases after the pressing compared to the capacitance between the first displacement detection electrode 81 and the second displacement detection electrode 82 before the pressing, and negative values indicate the opposite.

As shown in FIG. 10, it can be seen that the capacitance changes in the negative direction in the four corner vicinal regions of the base substrate 31. This is the result of the increase in the distance between the cover panel 10 and the base substrate 31 due to the pressing.

FIG. 11 shows the ratio of the capacitance change occurring between the first displacement detection electrode 81 and the second displacement detection electrode 82 when the pressing force of 1 N/cm$^2$ is applied to a region on the cover panel 10 in the vicinity of a corner of the operation region 13 by the indicator 8 mm in diameter in regard to each of the four second displacement detection electrodes 82A, 82C, 82E, 82G. As shown in FIG. 11, it can be seen that the capacitance changes in the negative direction in one corner vicinal region of the base substrate 31 in the vicinity of the pressed part. This is the result of the increase in the distance between the cover panel 10 and the base substrate 31 due to the pressing similarly to the case of FIG. 10.

As described above, in the first embodiment, it has been shown that the pressing on the top surface of the cover panel 10 is detected as a change in the capacitance between the first displacement detection electrode 81 and the second displacement detection electrode 82.

Next, a description will be given of the result of measurement performed by connecting a detection circuit to the touch panel device 1 according to the first embodiment. The detection circuit is electrically connected to the first displacement detection electrode 81 and the second displacement detection electrode 82 by mounting a flexible printed circuit board. A charge detector is electrically connected to the first displacement detection electrode 81 or the second displacement detection electrode 82 in order to detect the capacitance. The charge detector is a detection integrator, for example. The detection integrator outputs information on electric charge charged on the capacitance due to influence of application of an excitation signal, as an analog voltage value (i.e., a count). This count is in proportional relationship with a change amount of the capacitance of the electrodes. Incidentally, the second displacement detection electrode 82 is set at a GND (ground) potential in a case where the charge detector is connected to the first displacement detection electrode 81, or the first displacement detection electrode 81 is set at the GND potential in a case where the charge detector is connected to the second displacement detection electrode 82.

Figure 12:
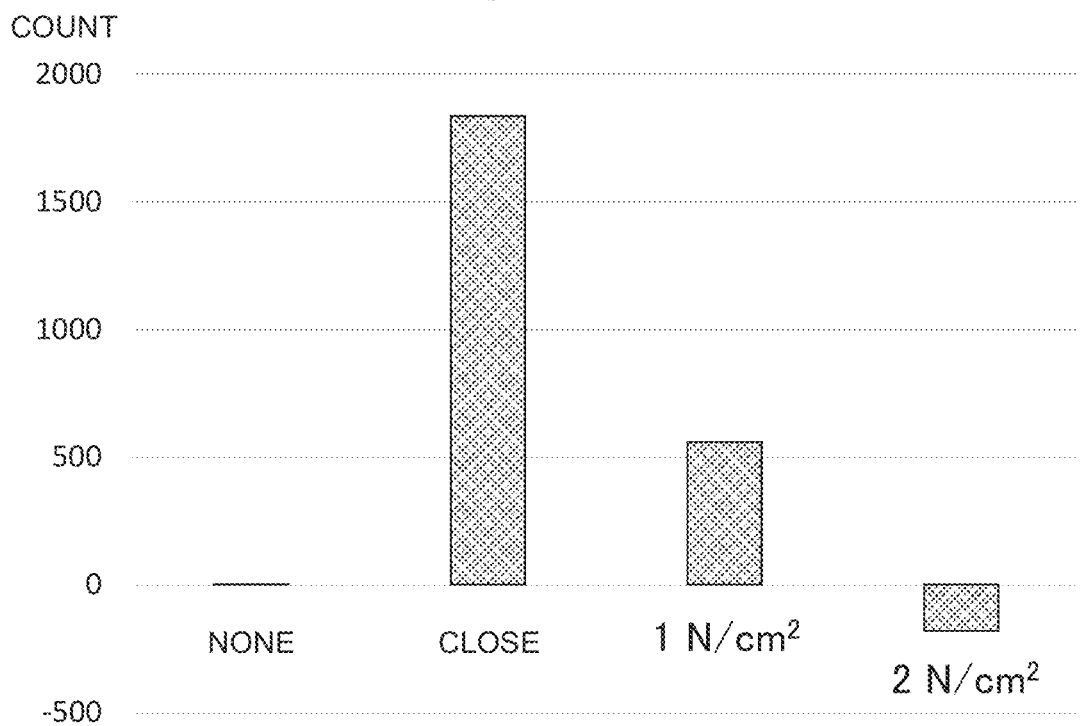
FIG. 12 is a graph showing a result of capacitance measurement of the first displacement detection electrode at the time of the pressing in the first embodiment.
Figure 13:
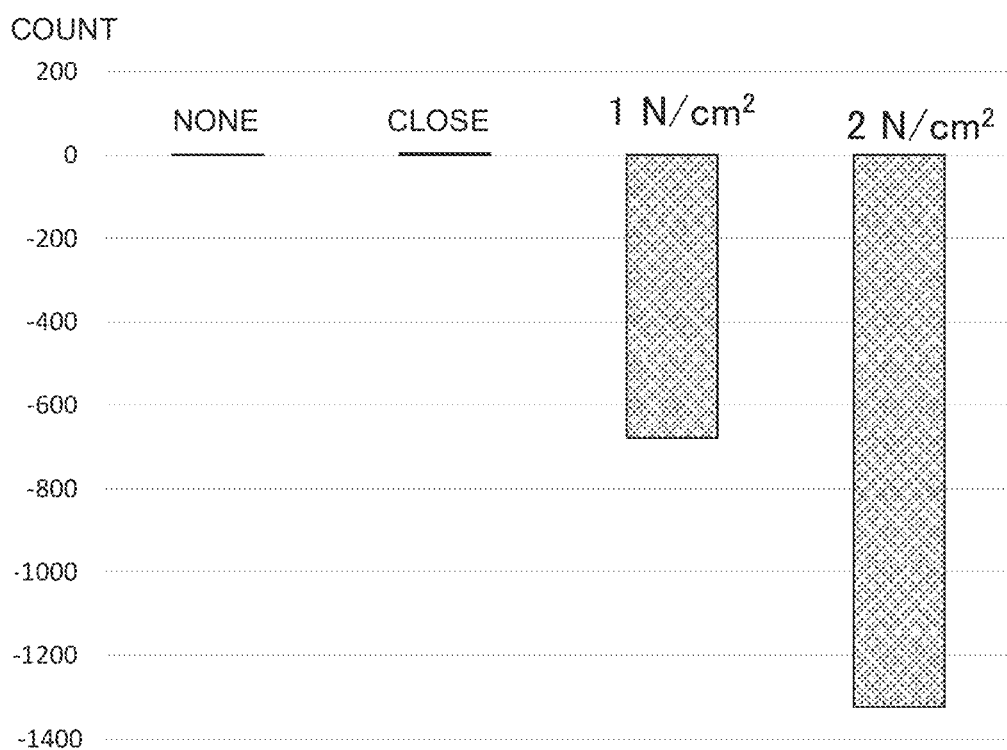
FIG. 13 is a graph showing a result of capacitance measurement of the first displacement detection electrode at the time of the pressing in the first embodiment.

FIG. 12 and FIG. 13 show detection values (counts) in the following four cases: (case 1) when there is no indicator; (case 2) when the electrically conductive indicator of 8 mm in diameter has come close to the cover panel 10 to a height of 0.5 mm; (case 3) when the electrically conductive indicator of 8 mm in diameter makes contact with the top surface of the cover panel 10 and applies pressing force of 1 N/cm$^2$; and (case 4) when the electrically conductive indicator of 8 mm in diameter applies pressing force of 2 N/cm$^2$ to the top surface of the cover panel 10, in a region in the vicinity of a corner of the operation region 13. FIG. 12 shows the measurement results when the charge detector is connected to the first displacement detection electrode 81 and the second displacement detection electrode 82 is at the GND potential. FIG. 13 shows the measurement results when the charge detector is connected to the second displacement detection electrode 82 and the first displacement detection electrode 81 is connected to the GND potential.

As shown in FIG. 12, while the detection value does not change when there is no indicator, the detection value increases when the electrically conductive indicator comes close, and decreases when the electrically conductive indicator further makes contact and applies pressing force. In contrast, in FIG. 13, it can be seen that the detection value does not change when the electrically conductive indicator just comes close and the detection value starts decreasing when the pressing force is applied.

This is because the charge detector when connected to the first displacement detection electrode 81 detects all capacitance connected to the first displacement detection electrode 81 and thus simultaneously measures the capacitance of the electrically conductive indicator and the capacitance between the first displacement detection electrode 81 and the second displacement detection electrode 82 whereas the charge detector when connected to the second displacement detection electrode 82 measures only the capacitance between the first displacement detection electrode 81 and the second displacement detection electrode 82.

Accordingly, in order to measure the pressing force without being influenced by the approach of the indicator, it is desirable to make the connection to the detection circuit so that the charge detector is connected to the second displacement detection electrode 82 and the GND potential is inputted to the first displacement detection electrode.

Figure 14:
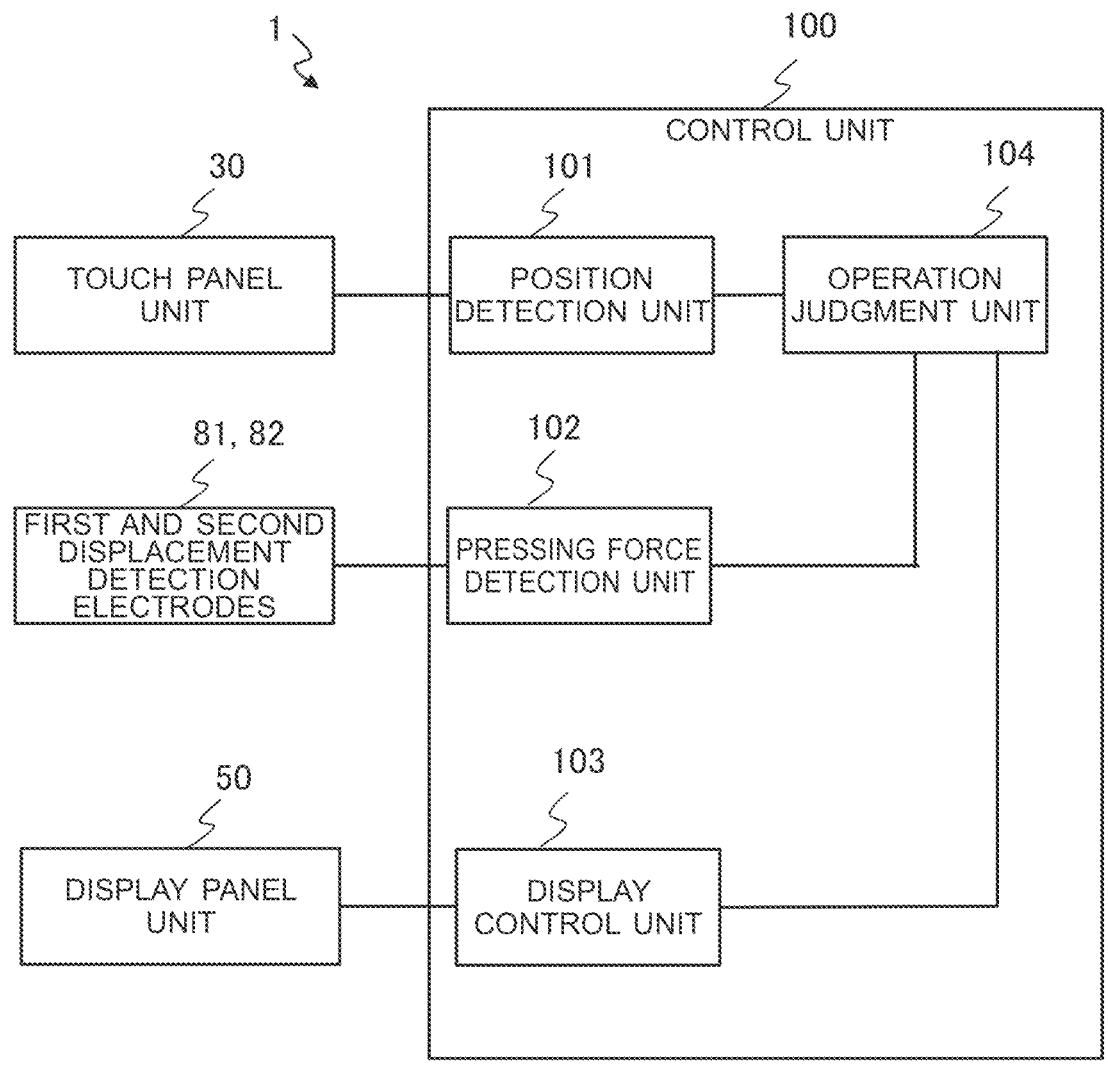
FIG. 14 is a functional block diagram showing an example of the configuration of a control unit of the touch panel device according to the first embodiment.

FIG. 14 is a functional block diagram showing an example of the configuration of a control unit 100 of the touch panel device 1. As shown in FIG. 14, the control unit 100 includes a position detection unit 101 that detects the touch position based on the change in the capacitance between electrodes in the touch panel unit 30, a pressing force detection unit 102 that detects the pressing force based on the capacitance between the first displacement detection electrode 81 and the second displacement detection electrode 82, and an operation judgment section 104 that judges the touch operation based on the detected touch position and pressing force and outputs a signal corresponding to the touch operation. The pressing force detection unit 102 can include the charge detector capable of inputting a predetermined drive signal to the second displacement detection electrode 82 and detecting an electric charge induced in the second displacement detection electrode 82. Furthermore, the control unit 100 includes a display control unit 103 that controls the display operation of the display panel unit 50. For example, the operation judgment unit 104 is capable of judging that the touch operation is valid and outputting an output signal based on the touch position when the pressing force is greater than or equal to a predetermined threshold value and judging that the touch operation is invalid and not outputting the output signal based on the touch position when the pressing force is less than the predetermined threshold value.

Figure 15:
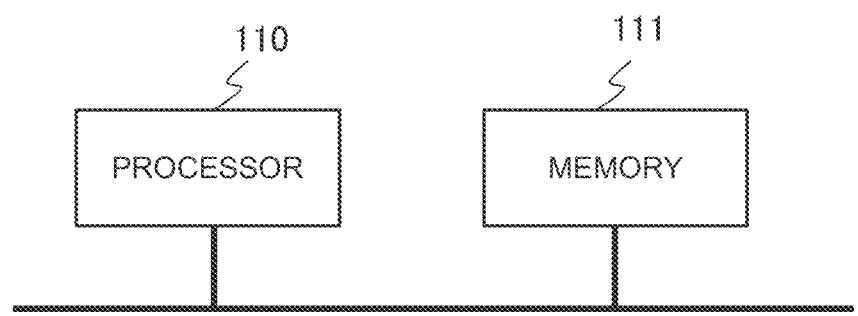
FIG. 15 is a diagram showing an example of the hardware configuration of the touch panel device according to the first embodiment.

FIG. 15 is a diagram showing an example of the hardware configuration of the control unit 100 of the touch panel device 1. The control unit 100 shown in FIG. 15 can be achieved by using a memory 111 as a storage device that stores a program as software and a processor 110 as an information processing unit that executes the program stored in the memory 111 (e.g., by a computer). In this case, the control unit 100 in FIG. 14 corresponds to the processor 110 executing the program. Incidentally, it is also possible to form a part of the control unit 100 shown in FIG. 14 with an electric circuit and achieve the remaining part of the control unit 100 by the memory 111 shown in FIG. 15 and the processor 110 executing a program.

As described above, the structure with which the change in the capacitance between the cover panel 10 and the base substrate 31 immediately under the cover panel 10 can be detected is employed and the adhesive material between the cover panel 10 and the base substrate 31 can be thinned down to approximately some tens of microns, and thus high detection sensitivity can be secured in the pressure detection even if the deformation of the cover panel 10 is slight.

Furthermore, since the first displacement detection electrode 81 and the second displacement detection electrode 82 are arranged outside the operation region 13, the arrangement of the first displacement detection electrode 81 and the second displacement detection electrode 82 does not cause deterioration in the display performance.

Furthermore, according to the first embodiment, it is possible to realize a touch panel device 1 in which the pressing force can be detected even across the cover panel 10 and the addition of the pressing force detection function does not cause the increase in the reflectance and the decrease in the transmittance in the operation region 13.

Incidentally, while the structure including the cover panel 10, the touch panel unit 30, the display panel unit 50 and the backlight unit 70 has been shown in the first embodiment, the pressure can be detected similarly even with a single structure to which the cover panel 10 and the touch panel unit 30 have been attached. However, when the display panel unit 50 is attached to the touch panel unit 30, binding force on an under surface of the touch panel unit 30 increases and thus the change in the capacitance between the first displacement detection electrode 81 and the second displacement detection electrode 82 occurring at the time of the pressing increases further in top surface edge parts of the touch panel unit 30 where the binding force from the cover panel 10 is weak, and accordingly, it is desirable to attach the display panel unit 50.

(2) Second Embodiment

A second embodiment differs from the first embodiment in that second displacement detection electrodes 82B, 82D, 82F and 82H are further arranged additionally and the touch panel device operates based on the difference in the capacitance. Except for these features, the second embodiment is the same as the first embodiment. The second displacement detection electrodes 82B, 82D, 82F and 82H are referred to also as side electrode parts.

Figure 16:
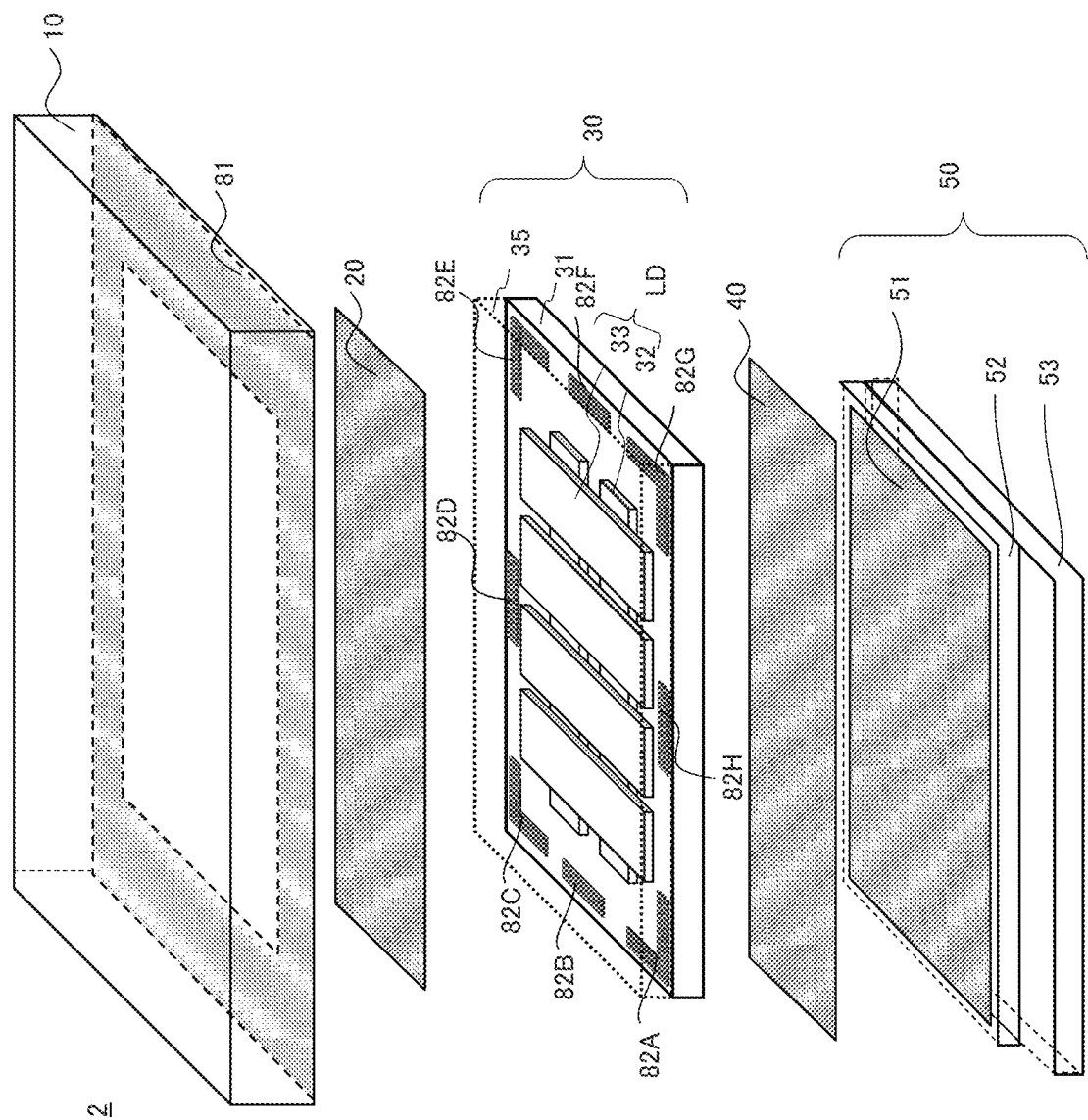
FIG. 16 is an exploded perspective view showing the structure of a touch panel device according to a second embodiment of the present invention in a simplified form.
Figure 17:
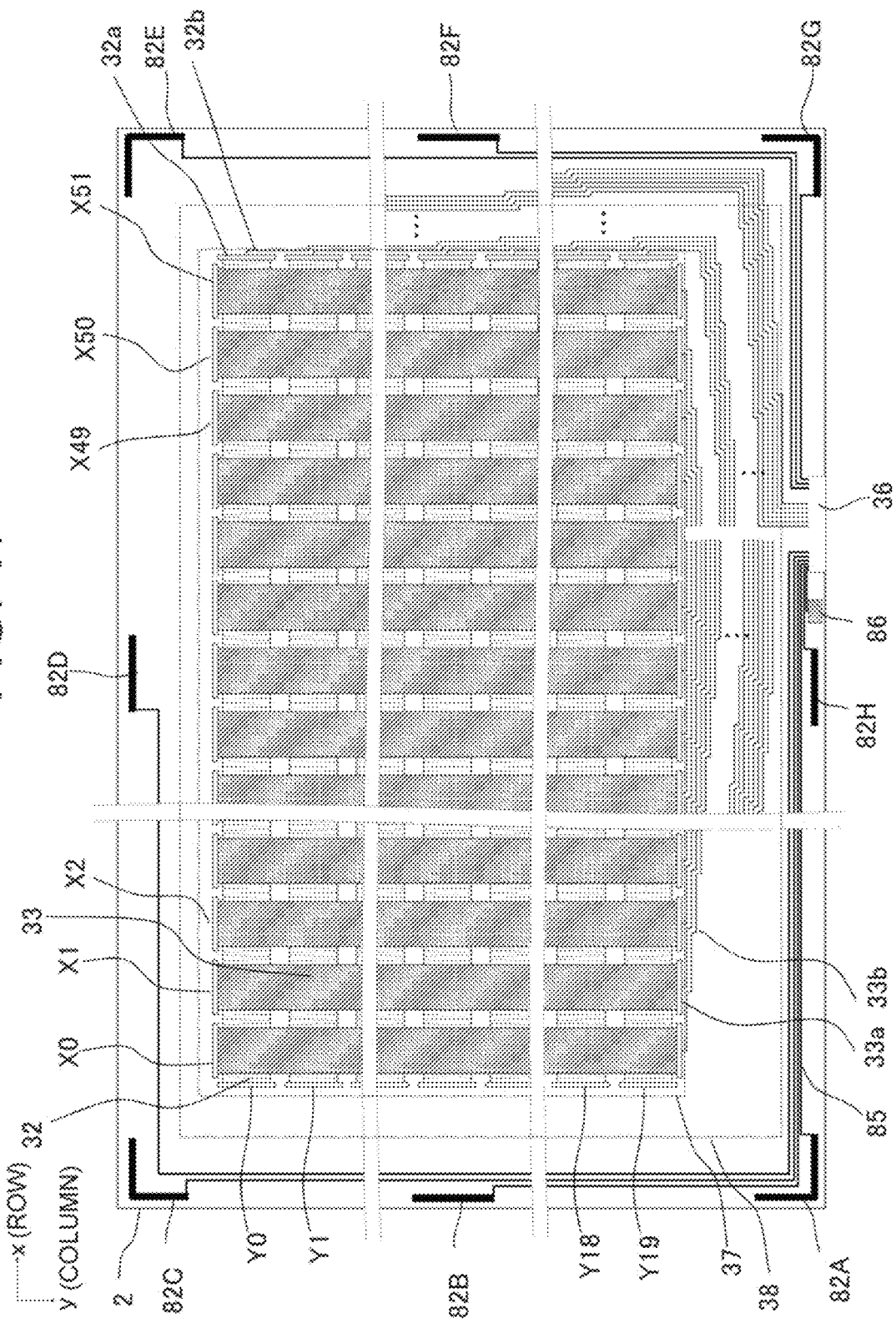
FIG. 17 is a plan view schematically showing the structure of a touch panel unit of the touch panel device according to the second embodiment.

A partially sectional view schematically showing the configuration of a touch panel device 2 according to the second embodiment is the same as that in the first embodiment (FIG. 4). FIG. 16 is an exploded perspective view showing the structure of the touch panel device 2 according to the second embodiment in a simplified form. FIG. 17 is a plan view schematically showing the structure of a touch panel unit 30 of the touch panel device 2.

The touch panel device 2 is capable of identifying the position indicated by the indicator. The touch panel device 2 includes the cover panel 10, the touch panel unit 30, the display panel unit 50 and the backlight unit 70.

As shown in FIG. 17, the four corner vicinal regions of the base substrate 31 outside the outline 38 (FIG. 17) of the first adhesive material and four side vicinal regions of the base substrate 31 respectively in the vicinity of the four sides of the base substrate 31 are respectively provided with the second displacement detection electrodes 82 (i.e., 82A, 82B, 82C, 82D, 82E, 82F, 82G 82H) formed simultaneously with the column electrodes 32. Each of the second displacement detection electrodes 82 is connected to the external terminal part 86 by the lead wire 85. Incidentally, it is also possible to form the second displacement detection electrodes 82 simultaneously with not the column electrodes 32 but the row electrodes 33.

By arranging the second displacement detection electrodes 82 and their respective lead wires 85 to be electrically separate from the column electrodes 32 and the row electrodes 33 as above, the detection of the touch position and the detection of the pressing force can be executed independently of each other. Furthermore, since the connections of the second displacement detection electrodes 82A-82H are also made independently of each other by the lead wires 85, a detection value can be obtained from each of the electrodes, and thus the detection sensitivity can be increased by making it possible to select the maximum detection value at the time of the pressing.

The second displacement detection electrode 82 is situated at a position to face the first displacement detection electrode 81, and the first displacement detection electrode 81 is larger than the second displacement detection electrode 82 in a plan view and is arranged to totally cover the second displacement detection electrode 82. With this configuration, the capacitance formed between the electrically conductive indicator and the second displacement detection electrode 82 when the indicator comes close to the top surface of the cover panel 10 is shielded by the first displacement detection electrode 81. Consequently, the capacitance connected to the second displacement detection electrode 82 can be made to change corresponding to the change in the distance between the first displacement detection electrode 81 and the second displacement detection electrode 82.

Furthermore, since the second displacement detection electrode 82 is formed outside the outline 38 of the adhesive material 20, an air layer is formed between the first displacement detection electrode 81 and the second displacement detection electrode 82. With this configuration, the deformation amount difference can be caused between the deformation amount of the cover panel 10 and the deformation amount of the base substrate 31 when the top surface of the cover panel 10 is pressed with the indicator as will be described later.

Incidentally, the shape of the corner electrode 82 does not necessarily have to be a shape including two straight line parts arranged orthogonally and connected to each other. For example, the shape of the corner electrode 82 can be a shape including a curved line part (i.e., arc-like part) and straight line parts like that shown in FIG. 7A, a shape including three or more straight line parts connected to each other like that shown in FIG. 7B, a shape in which the thickness of each line segment varies partially (i.e., a shape in which the width of each line segment is wide in the vicinity of a corner of a rectangle) like that shown in FIG. 7C, a shape including two straight line parts and line segment parts branching from these straight line parts like that shown in FIG. 7D, or the like. The shape of the corner electrode 82 can also be a shape having a structure as a combination of two or more of FIGS. 7A to 7D.

Furthermore, the corner part of the base substrate 31 does not necessarily have to be in a shape like an orthogonal corner of a rectangle. For example, the corner part of the base substrate 31 can be in a shape including three or more linear sides like that shown in FIG. 7E, a shape including a side like a curved line (i.e., a side like an arc) like that shown in FIG. 7F, a shape in which two linear sides intersect at an angle other than 90 degrees like that shown in FIG. 7G, or the like.

Furthermore, the shape of the base substrate 31 in a plan view can also be a shape other than a quadrangle, such as a polygon other than a quadrangle. In this case, the corner part of the base substrate 31 can also be in a shape having a structure as a combination of two or more of FIGS. 7E to 7G. However, in case where the shape of the base substrate 31 in a plan view is a circular shape or an elliptical shape, the corner electrode 82 is arranged somewhere in the space outside the outline 38 of the adhesive material 20.

The deformation amount difference between the deformation of the cover panel 10 and the deformation of the base substrate 31 when the top surface of the cover panel 10 in the second embodiment is pressed with the indicator is the same as that in the first embodiment. As shown in FIG. 8 and FIG. 9 in the first embodiment, when the operation region 13 is pressed with the indicator, the deformation amount difference occurs at one or all of the four corners of the base substrate 31. Furthermore, since the deformation amount difference differs from each among the four corners, the deformation amount differences in the four side vicinal regions can be obtained as detection values different from each among the second displacement detection electrodes 82 by forming the second displacement detection electrode 82 in the four corner vicinal regions and the four side vicinal regions on the base substrate 31 as shown in the second embodiment.

Figure 18:
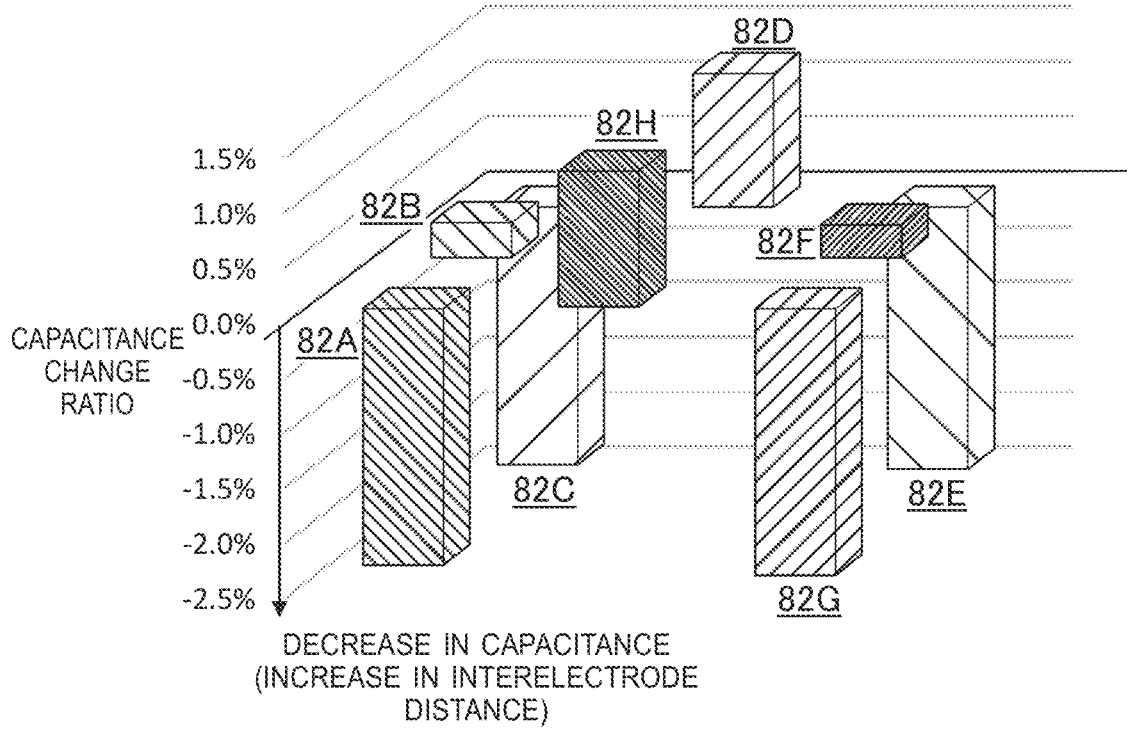
FIG. 18 is a graph showing the ratio of change of the capacitance between the first displacement detection electrode and the second displacement detection electrode when a position in the vicinity of the central position of the cover panel of the touch panel device according to the second embodiment is pressed.
Figure 19:
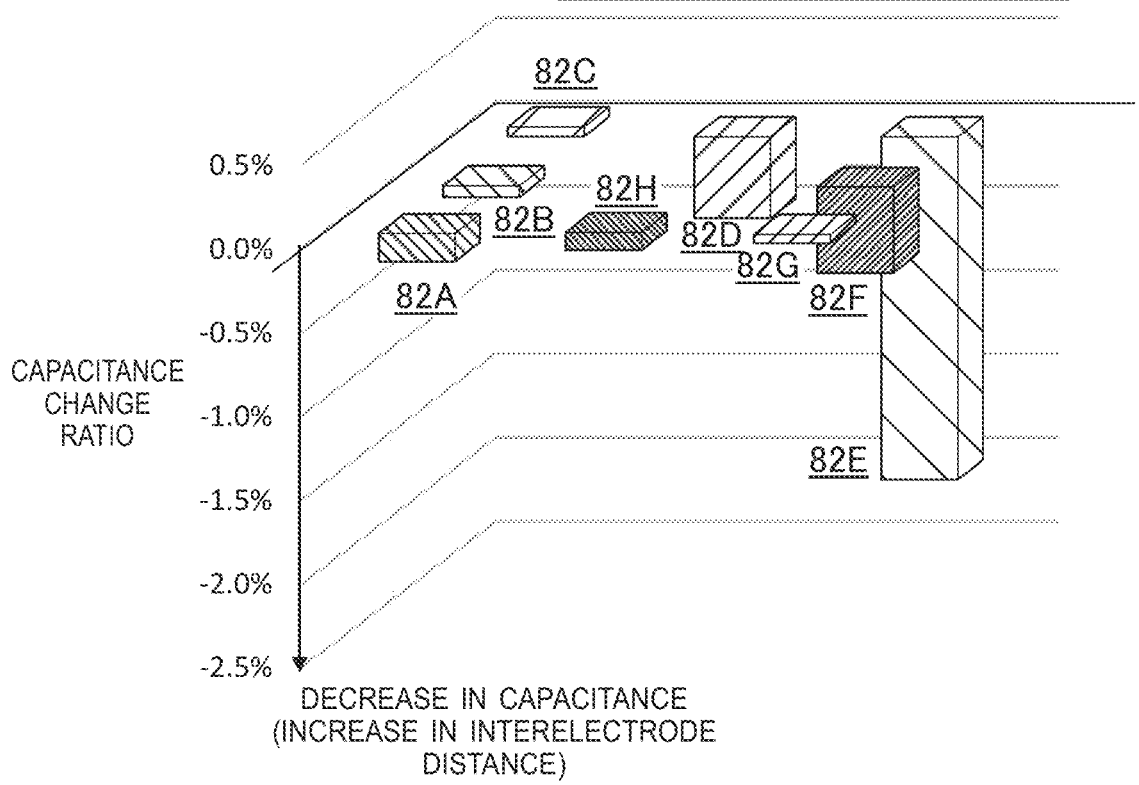
FIG. 19 is a graph showing the ratio of change of the capacitance between the first displacement detection electrode and the second displacement detection electrode when a position in the vicinity of a corner of the cover panel of the touch panel device according to the second embodiment is pressed.

FIG. 18 is a graph showing the ratio of change of the capacitance between the first displacement detection electrode 81 and the second displacement detection electrode 82 when a position in the vicinity of the central position of the cover panel 10 of the touch panel device 2 is pressed. FIG. 19 is a graph showing the ratio of change of the capacitance between the first displacement detection electrode 81 and the second displacement detection electrode 82 when a position in the vicinity of a corner of the cover panel 10 of the touch panel device 2 is pressed. The capacitance change occurring between the first displacement detection electrode 81 and the second displacement detection electrode 82 when the top surface of the cover panel 10 in the second embodiment is pressed with the indicator will be described below with reference to FIG. 18 and FIG. 19. FIG. 18 and FIG. 19 show results of calculation of the capacitance changes caused by the deformation amount differences shown in FIG. 8 and FIG. 9. Incidentally, the thickness of the cover panel 10 is 2.0 mm, the thickness of the base substrate 31 is 0.7 mm, and the total thickness of the liquid crystal panel is 1.5 mm.

FIG. 18 shows the ratio of the capacitance change occurring between the first displacement detection electrode 81 and the second displacement detection electrode 82 when the pressing force of 1 N/cm$^2$ is applied to the central position of the cover panel 10 by the indicator 8 mm in diameter in regard to each of the eight second displacement detection electrodes 82A-82H. On the Z-axis as the vertical axis of the graph, positive values indicate that the capacitance increases after the pressing compared to the capacitance between the first displacement detection electrode 81 and the second displacement detection electrode 82 before the pressing, and negative values indicate the opposite.

As shown in FIG. 18, it can be seen that the capacitance changes in the negative direction in the four corner vicinal regions of the base substrate 31. In contrast, in the four side vicinal regions, it can be seen that the capacitance changes in the positive direction. This is the result of the increase in the distance between the cover panel 10 and the base substrate 31 in the four corner vicinal regions due to the pressing and the decrease in the distance between the cover panel 10 and the base substrate 31 in the four side vicinal regions due to the pressing.

FIG. 19 shows the ratio of the capacitance change occurring between the first displacement detection electrode 81 and the second displacement detection electrode 82 when the pressing force of 1 N/cm$^2$ is applied to a region on the cover panel 10 in the vicinity of a corner of the operation region 13 by the indicator 8 mm in diameter in regard to each of the eight second displacement detection electrodes 82A-82H. As shown in FIG. 19, it can be seen that the capacitance changes in the negative direction in one corner vicinal region and two side vicinal regions of the base substrate 31 in the vicinity of the pressed part. This is the result of the increase in the distance between the cover panel 10 and the base substrate 31 due to the pressing.

The capacitance change ratios calculated according to FIG. 18 and FIG. 19 are on the order of several % and there is a danger that the detection sensitivity cannot be made sufficiently high in case where the cover panel 10 is thickened further.

Figure 20:
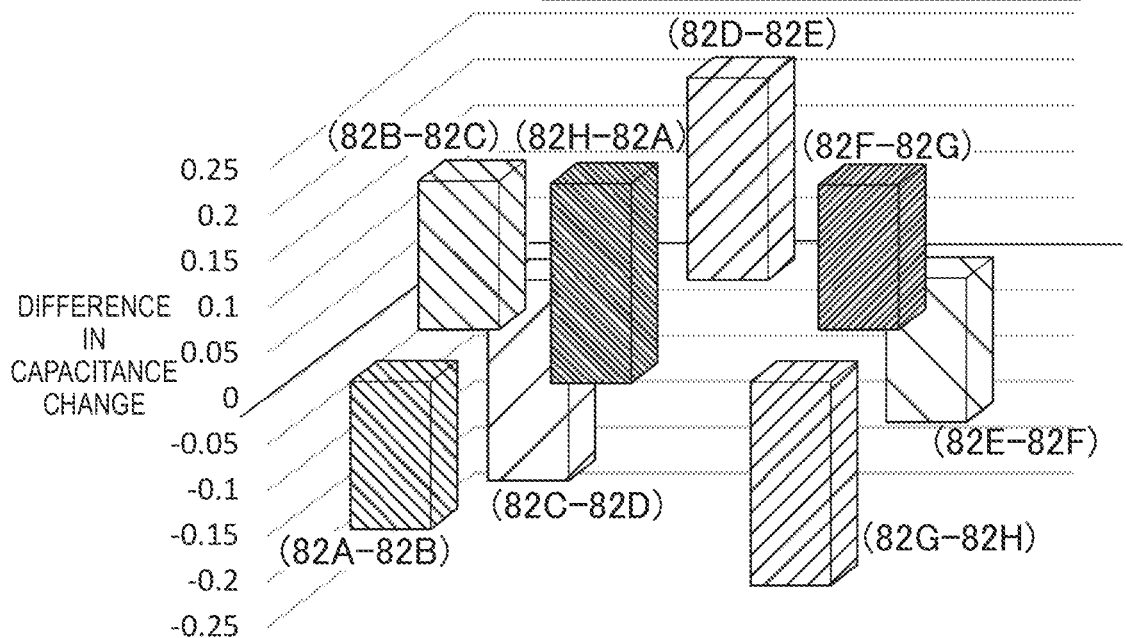
FIG. 20 is a graph showing the ratio of change of the capacitance between the first displacement detection electrode and the second displacement detection electrode at the time of the pressing in the second embodiment.
Figure 21:
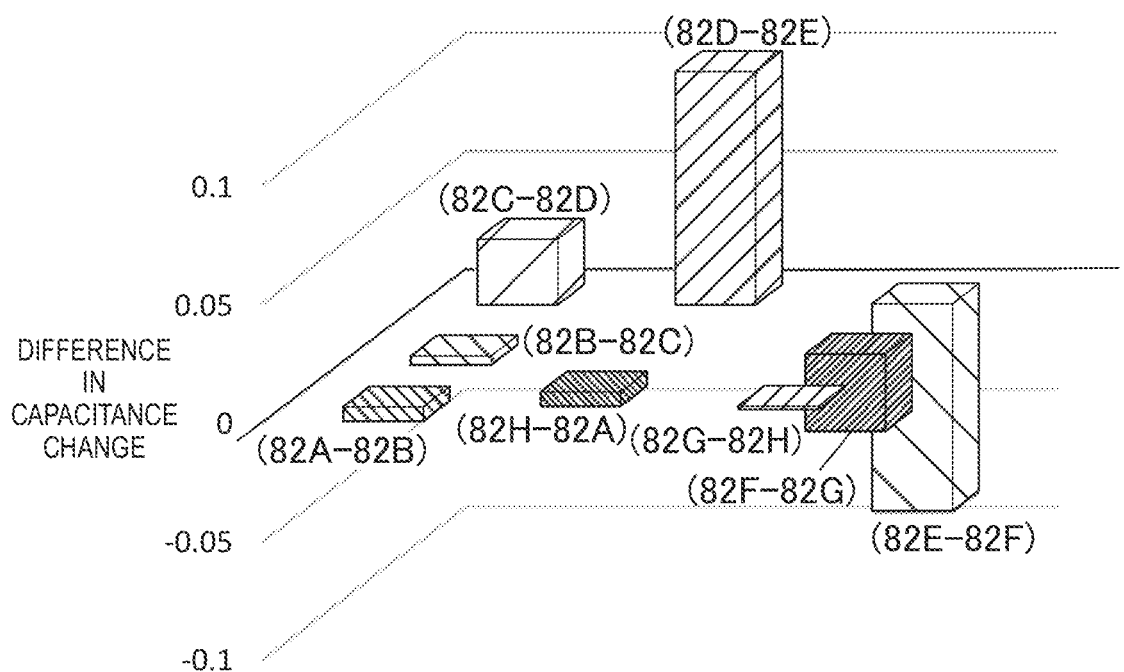
FIG. 21 is a graph showing the ratio of change of the capacitance between the first displacement detection electrode and the second displacement detection electrode at the time of the pressing in the second embodiment.

A method for increasing the ratio of the capacitance change due to the pressing in the touch panel device 2 in the second embodiment will be described below with reference to FIG. 20 and FIG. 21. FIG. 20 and FIG. 21 show results of calculation of differences between capacitance change amounts such as a value (represented as (82A-82B)) obtained by subtracting the capacitance change amount of the second displacement detection electrode 82B from the capacitance change amount of the second displacement detection electrode 82A, a value (represented as (82B-82C)) obtained by subtracting the capacitance change amount of the second displacement detection electrode 82C from the capacitance change amount of the second displacement detection electrode 82B, and so forth until a value (82H-82A).

FIG. 20 shows each of the capacitance change amount differences when the pressing force of 1 N/cm$^2$ is applied to the central position of the cover panel 10 by the indicator 8 mm in diameter. The unit regarding the Z-axis as the vertical axis of the graph is picofarad (pF). It can be seen from FIG.

20 and FIG. 21 that the capacitance change amount difference occurs distinctly at the time of the pressing. If the second displacement detection electrodes 82 are formed to be equal to each other in the area, the second displacement detection electrodes 82 have the same capacitance as each other before the pressing, and thus the capacitance change ratio can be made to be an extremely large value (e.g., near infinity).

As described above, in the touch panel device 2 according to the second embodiment, the capacitance change ratio can be increased significantly by forming the second displacement detection electrode 82 in each corner vicinal region and each side vicinal region on the base substrate 31 and calculating the difference in the capacitance change amount at the time of the pressing. Furthermore, the touch panel device 2 according to the second embodiment is capable of increasing the detection sensitivity compared to the touch panel device described in the first embodiment.

While the second displacement detection electrode 82 is formed in all of the side vicinal regions of the four sides in the touch panel device 2 according to the second embodiment, it is also possible to form the second displacement detection electrode 82 in part of the side vicinal regions. Even in a case where the second displacement detection electrode 82 is formed in only one of the side vicinal regions, if the capacitance at the position before the pressing is equal to the capacitance in each corner vicinal region and a difference occurs to the capacitance change amount after the pressing, it is possible to increase the detection sensitivity by calculating the difference by using the second displacement detection electrode 82 in the one side vicinal region as the reference.

Except for the above-described features, the second embodiment is the same as the first embodiment.

(3) Third Embodiment

A touch panel device 3 according to a third embodiment differs from the touch panel devices 1 and 2 according to the first and second embodiments in that an outer periphery of the cover panel 10 is fixed to a support part of a housing 91. Such a setting method of the housing 91 is often used for products employing seamless design as typified by smartphones, tablet terminals and the like.

Figure 22:
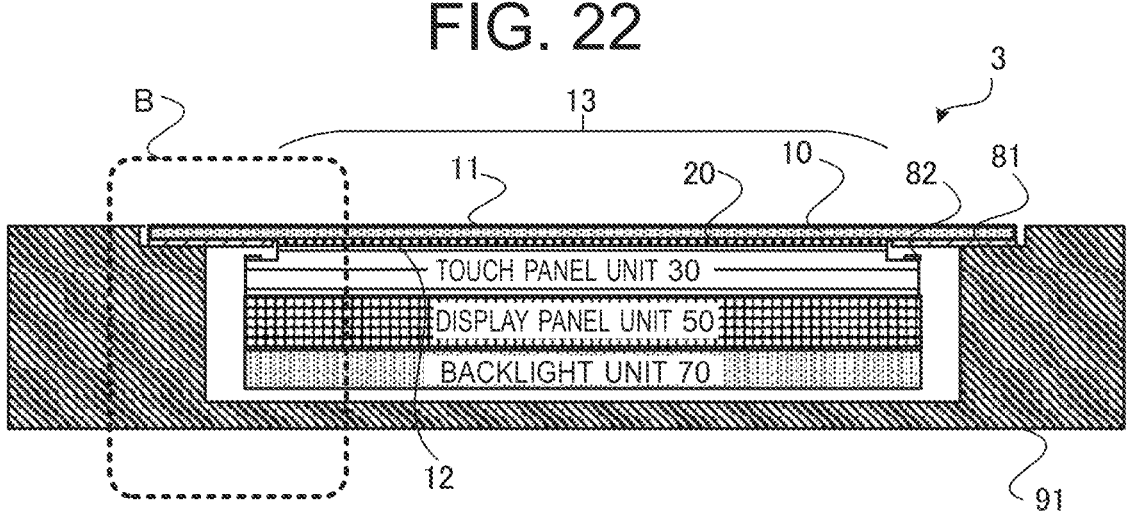
FIG. 22 is a cross-sectional view schematically showing the structure of a touch panel device according to a third embodiment of the present invention.
Figure 23:
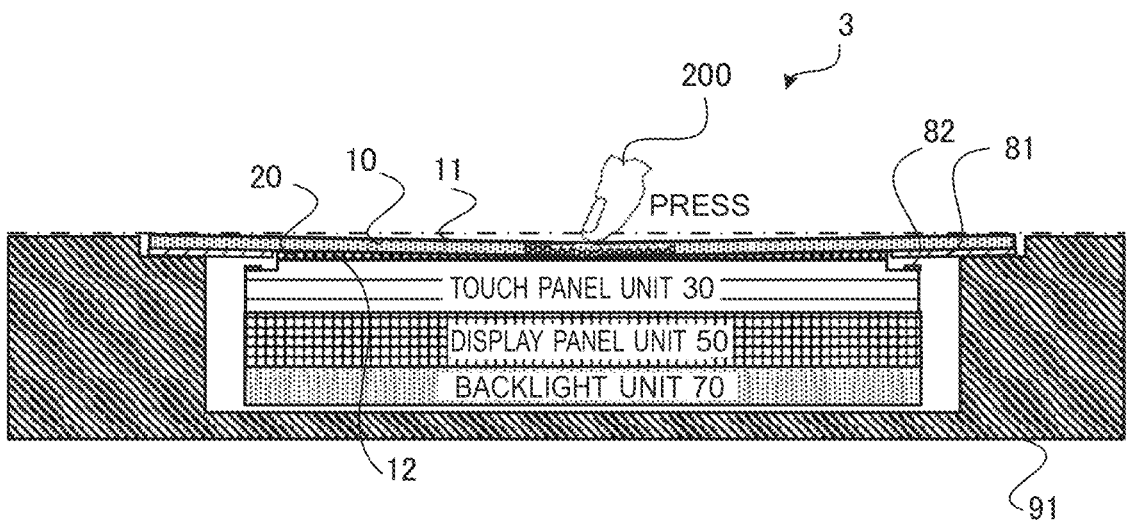
FIG. 23 is a cross-sectional view schematically showing the state of the cover panel when a position in the vicinity of the central position of the cover panel of the touch panel device according to the third embodiment is pressed.
Figure 24:
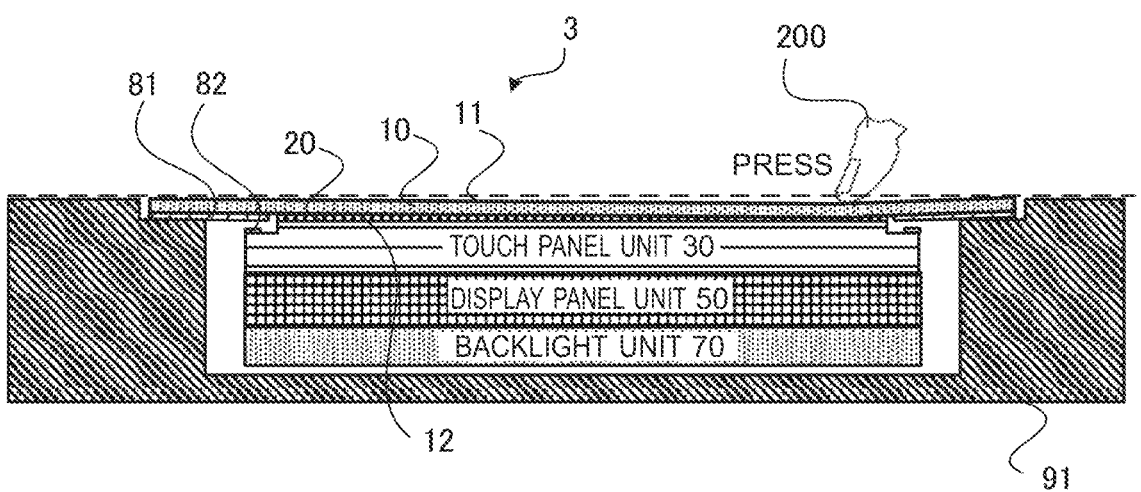
FIG. 24 is a cross-sectional view schematically showing the state of the cover panel when a position in the vicinity of a corner of the cover panel of the touch panel device according to the third embodiment is pressed.

FIG. 22 is a cross-sectional view schematically showing the structure of the touch panel device 3 according to the third embodiment. FIG. 23 is a cross-sectional view schematically showing the state of the cover panel 10 when a position in the vicinity of the central position of the cover panel 10 of the touch panel device 3 is pressed. FIG. 24 is a cross-sectional view schematically showing the state of the cover panel 10 when a position in the vicinity of a corner of the cover panel 10 of the touch panel device 3 is pressed. In the touch panel device 3, the housing 91 supports the outer periphery of the cover panel 10. The housing 91 and the outer periphery of the cover panel 10 are fixed to each other by using an adhesive agent, for example.

Similarly to the touch panel devices 1 and 2 according to the first and second embodiments, the touch panel device 3 includes the cover panel 10, the adhesive material 20, the touch panel unit 30, the first displacement detection electrode 81 and the second displacement detection electrodes 82.

The first displacement detection electrode 81 and the second displacement detection electrodes 82 are pressure sensor electrodes for detecting the pressing force applied by the touch operation. As shown in FIG. 23, when a position in the vicinity of the central position of the cover panel 10 is pressed, the vicinity of the central position of the cover panel 10 lowers towards the adhesive material 20 and the whole of the cover panel 10 is curved. At that time, the distance between the first displacement detection electrode 81 and the second displacement detection electrodes 82 changes (e.g., decreases) and the capacitance between the first displacement detection electrode 81 and the second displacement detection electrodes 82 (referred to also as the second capacitance) changes.

Furthermore, the touch panel device 3 includes the display panel unit 50. The display panel unit 50 is a liquid crystal panel unit including a liquid crystal display, for example. In the case where the display panel unit 50 is a liquid crystal panel unit, the touch panel device 3 may include the backlight unit 70.

Figure 25:
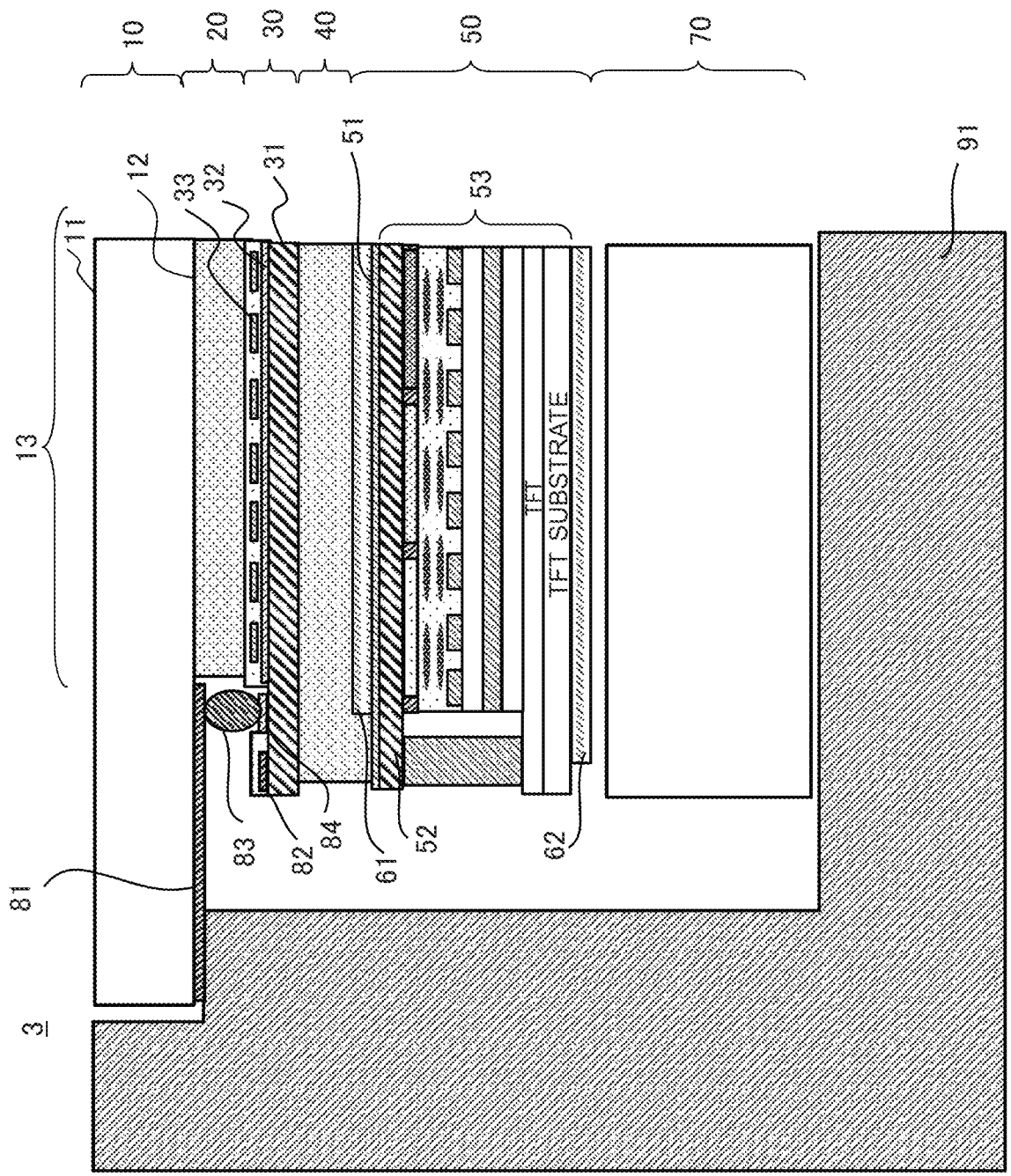
FIG. 25 is a cross-sectional view schematically showing the structure of a part of the touch panel device according to the third embodiment corresponding to the part B in FIG. 22.
Figure 26:
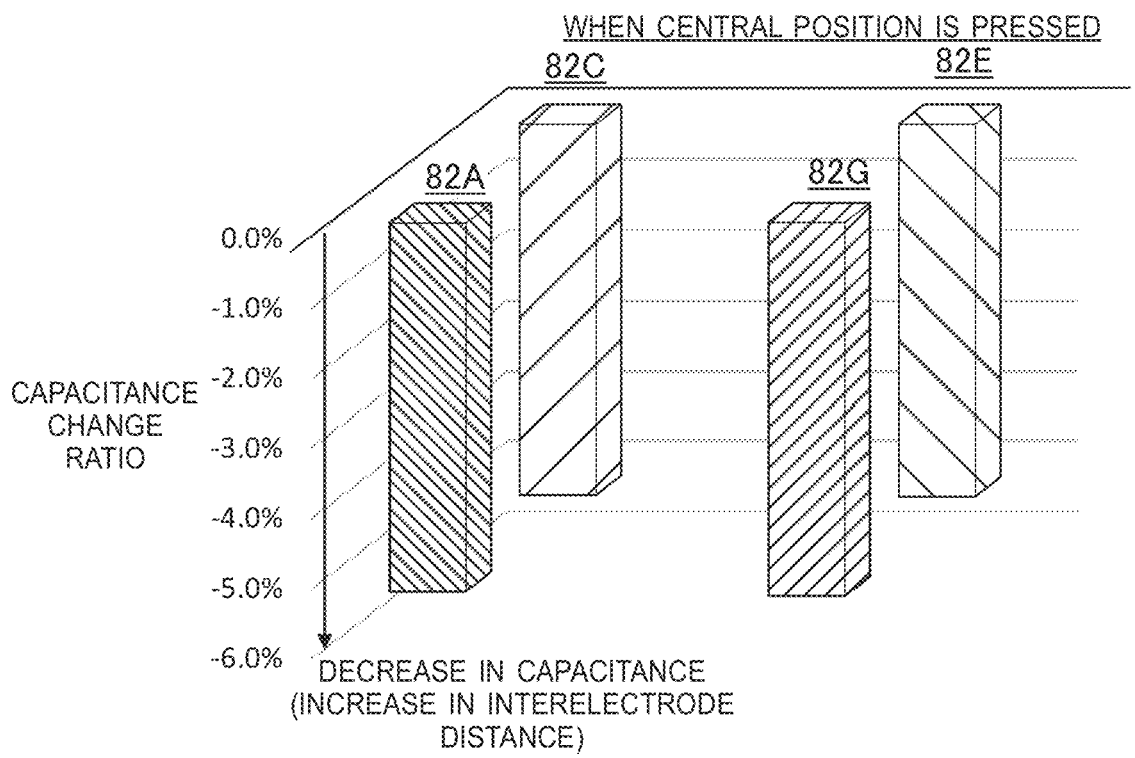
FIG. 26 is a graph showing the ratio of change of the capacitance between the first displacement detection electrode and the second displacement detection electrode when a position in the vicinity of the central position of the cover panel of the touch panel device according to the third embodiment is pressed.

FIG. 25 is a cross-sectional view schematically showing the structure of a part of the touch panel device 3 corresponding to the part B in FIG. 22. FIG. 26 is a graph showing the ratio of change of the capacitance between the first displacement detection electrode 81 and the second displacement detection electrode 82 when a position in the vicinity of the central position of the cover panel of the touch panel device 3 is pressed. The structure of the touch panel unit 30 of the touch panel device 3 is the same as that in FIG. 5 and FIG. 6 in the first embodiment.

The touch panel device 3 is capable of identifying the position indicated by the indicator. The touch panel device 3 includes the cover panel 10, the adhesive material 20, the touch panel unit 30, the display panel unit 50 and the backlight unit 70. Furthermore, the cover panel 10 is larger than the touch panel unit 30 and the display panel unit 50 in the external shape, and the whole of the outer periphery of the cover panel 10 has the overhanging structure. An under surface of the overhanging part of the cover panel 10 is fixed to the support part of the housing 91 via double-stick tape, for example, and is put in the housing 91.

In the touch panel device 3 according to the third embodiment, the structure of the cover panel 10 and the touch panel unit 30 is the same as that in the first embodiment.

Figure 27:
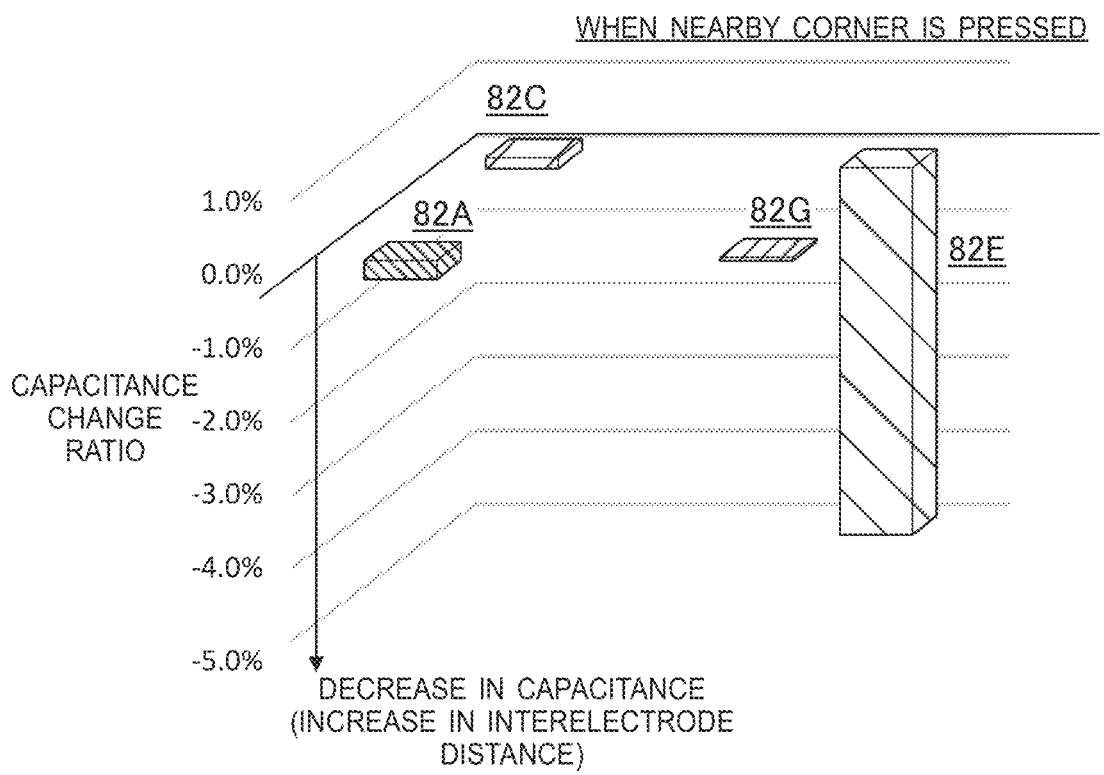
FIG. 27 is a graph showing the ratio of change of the capacitance between the first displacement detection electrode and the second displacement detection electrode when a position in the vicinity of a corner of the cover panel of the touch panel device according to the third embodiment is pressed.

FIG. 26 is a graph showing the ratio of change of the capacitance between the first displacement detection electrode 81 and the second displacement detection electrode 82 when a position in the vicinity of the central position of the cover panel 10 of the touch panel device 3 is pressed. FIG. 27 is a graph showing the ratio of change of the capacitance between the first displacement detection electrode 81 and the second displacement detection electrode 82 when a position in the vicinity of a corner of the cover panel 10 of the touch panel device 3 is pressed. The deformation amount difference between the deformation of the cover panel 10 and the deformation of the base substrate 31 when the top surface of the cover panel 10 in the third embodiment is pressed with the indicator will be described below with reference to FIG. 26 and FIG. 27. When the top of the cover panel 10 is pressed with the indicator, the cover panel 10 and the base substrate 31 are deformed. At that time, a difference occurs between the deformation amount of the cover panel 10 and the deformation amount of the base substrate 31. FIG. 8 and FIG. 9 show the deformation amounts calculated by using stress simulation. Incidentally, in the preconditions of the stress simulation, the thickness of the cover panel 10 is 2.0 mm, the thickness of the base substrate 31 is 0.7 mm, and the total thickness of the display panel unit 50 is 1.5 mm.

FIG. 26 shows the distribution of the deformation amount difference between the cover panel 10 and the base substrate 31 when the pressing force of 1 N/cm² is applied to the central position on the cover panel 10 by the indicator 8 mm in diameter. The X-axis (i.e., horizontal axis) and the Y-axis (i.e., axis orthogonal to the X-axis) of the graph represent coordinates on the base substrate 31, and on the Z-axis (i.e., vertical axis) of the graph, positive values indicate that the deformation of the cover panel 10 is greater than that of the base substrate 31 and negative values indicate the opposite. The Z-axis of the graph indicates values as relative values by using 1 as the maximum value among positive values.

As shown in FIG. 26, it can be seen that the deformation amount difference occurs in the positive direction in the four corner vicinal regions of the base substrate 31. This indicates that the distance between the cover panel 10 and the base substrate 31 increases due to the pressing. FIG. 27 shows the distribution of the deformation amount difference between the cover panel 10 and the base substrate 31 when the pressing force of 1 N/cm² is applied to a region on the cover panel 10 in the vicinity of a corner of the operation region 13 by the indicator 8 mm in diameter.

The capacitance change ratios shown in FIG. 26 and FIG. 27 are 5.0%-5.3%, which have increased to twice or over compared to the capacitance change ratios 2.0%-2.4% in the first embodiment (FIG. 10 and FIG. 11). This is because reaction force that the four corner vicinal regions receive from the housing 91 become relatively strong in the overhanging outer peripheral part of the cover panel 10 and the deformation amounts in the corner vicinal regions of the cover panel 10 increases.

As described above, the touch panel device 3 according to the third embodiment employs the structure in which the outer periphery of the cover panel 10 is fixed to the housing 91, by which the pressing force detection sensitivity is increased compared to the touch panel device 1 according to the first embodiment.

Incidentally, while the structure including the cover panel 10, the adhesive material 20, the touch panel unit 30, the display panel unit 50 and the backlight unit 70 has been shown in the third embodiment, the pressing force can be detected similarly even with the cover panel 10 and the touch panel unit 30 structurally integrated together into a single body.

However, when the display panel unit 50 is attached to the touch panel unit 30, the binding force on the under surface of the touch panel unit 30 increases and thus the change in the capacitance between the first displacement detection electrode 81 and the second displacement detection electrode 82 occurring at the time of the pressing increases further in the top surface edge parts of the touch panel unit 30 where the binding force from the cover panel 10 is weak. Therefore, it is desirable to attach the display panel unit 50 to the touch panel unit 30.

(4) Fourth Embodiment

A touch panel device 4 according to a fourth embodiment differs from the touch panel devices 1 to 3 according to the first to third embodiments in that the base substrate 31 of the touch panel unit 30 serves also as a color filter substrate 18. With such a configuration, the base substrate 31 and the adhesive material 40 can be reduced and the thinning and the member cost reduction of the touch panel device 4 can be realized.

Figure 28:
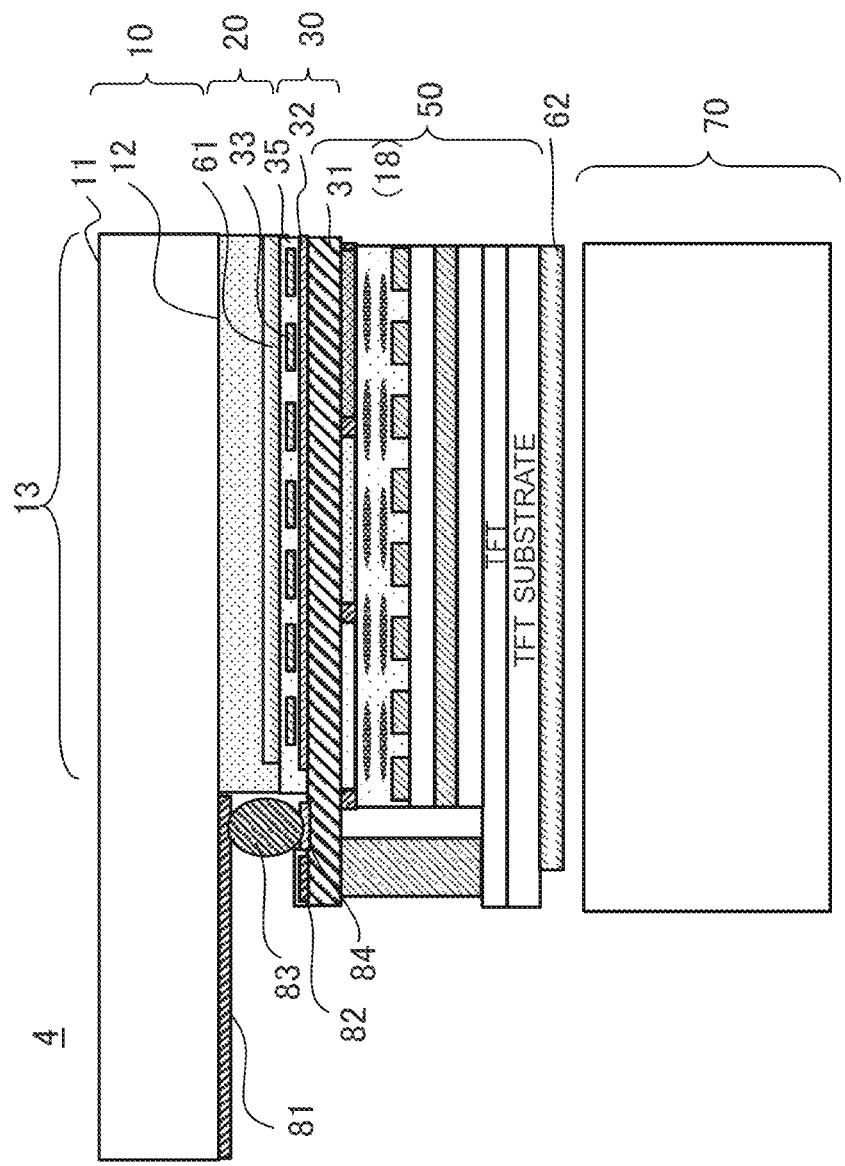
FIG. 28 is a cross-sectional view schematically showing the structure of a touch panel device according to a fourth embodiment of the present invention.
Figure 29:
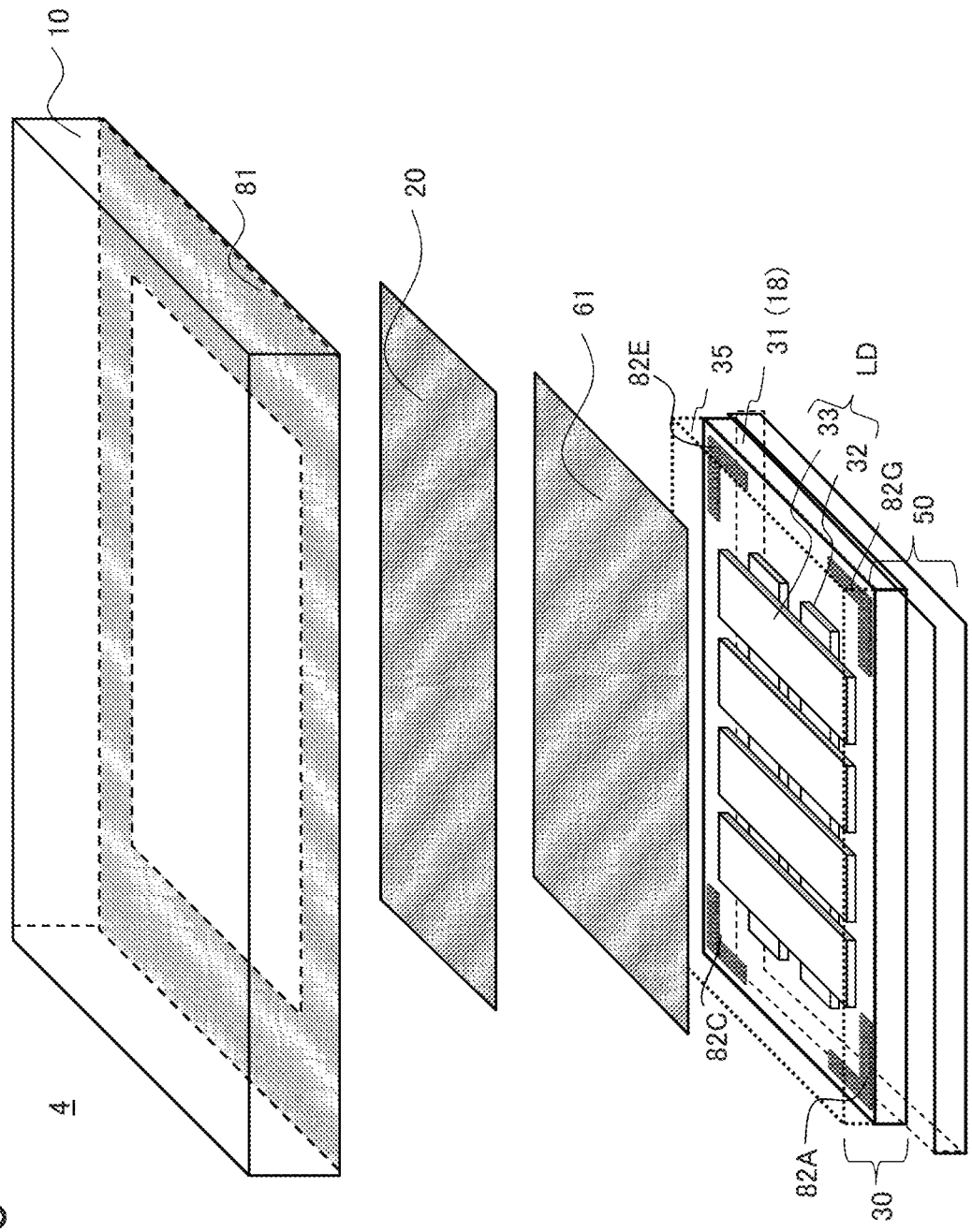
FIG. 29 is an exploded perspective view showing the structure of the touch panel device according to the fourth embodiment in a simplified form.

FIG. 28 is a cross-sectional view schematically showing the structure of the touch panel device 4 according to the fourth embodiment. FIG. 28 shows a part corresponding to the part A in FIG. 1. FIG. 29 is an exploded perspective view showing the structure of the touch panel device 4 in a simplified form. In the fourth embodiment, the structure of the touch panel unit 30 is similar to that in FIG. 6.

The touch panel device 4 is capable of identifying the position (i.e., coordinates in the operation region) indicated by the indicator such as a finger. The touch panel device 4 includes the cover panel 10, the adhesive material 20, the touch panel unit 30, the display panel unit 50 and the backlight unit 70. The display panel unit 50 is a liquid crystal panel unit, for example. In the display panel unit 50, a liquid crystal is sealed between a TFT (Thin Film Transistor) substrate and the color filter substrate 18. The base substrate 31 forming the touch panel unit 30 serves also as the color filter substrate 18.

Furthermore, in the fourth embodiment, the touch panel unit 30 is formed by the touch position detection layer LD and the base substrate 31 supporting the touch position detection layer LD. On the back side of the touch position detection layer LD, the base substrate 31 includes color materials for displaying the colors of the display panel unit 50 and a black matrix arranged between adjoining color materials. The touch panel unit 30 is joined to the inner surface of the cover panel 10 via the adhesive material 20 so that the touch position detection layer LD is situated between the cover panel 10 and the base substrate 31. Thus, the touch position detection layer LD is provided indirectly on the inner surface of the cover panel 10 via the adhesive material 20. Incidentally, the touch position detection layer LD may be covered by the protective film 35.

The configuration of the touch position detection layer LD is the same as that in FIG. 6. The difference (i.e., deformation amount difference) between the deformation of the cover panel 10 and the deformation of the base substrate 31 at the time of the pressing is the same as that in FIG. 8 and FIG. 9. The capacitance change between the first displacement detection electrode 81 and the second displacement detection electrode 82 occurring at the time of the pressing is the same as that in FIG. 10 and FIG. 11.

As described above, the touch panel device 4 according to the fourth embodiment, even though having the structure simplified by forming the base substrate 31 of the touch panel unit 30 and the color filter substrate 18 as a common substrate, is capable of detecting the pressing force of the touch operation across the robust cover panel 10 similarly to the touch panel device in the first embodiment.

Furthermore, the touch panel device 4 according to the fourth embodiment does not cause the increase in the light reflectance and the decrease in the light transmittance in the operation region (i.e., display region) 13 in spite of the addition of the pressing force detection function, and thus is capable of realizing a clear and vivid display screen.

Incidentally, while the example in which the second displacement detection electrode 82 is arranged in the four corner vicinal regions of the color filter substrate 18 has been shown in the fourth embodiment, it is also possible to arrange the second displacement detection electrode 82 also in the side vicinal regions similarly to the second embodiment. In this case, the capacitance change ratio can be increased by calculating the difference between the capacitance change amount in the corner vicinal region and the capacitance change amount in the side vicinal region.

Furthermore, the touch panel device 4 according to the fourth embodiment can employ the structure in which the outer periphery of the cover panel 10 is fixed to the housing 91 similarly to the third embodiment, by which the detection sensitivity of the touch panel device 4 shown in the fourth embodiment can be increased.

While the second displacement detection electrode 82 is formed on the base substrate 31 serving also as the color filter substrate 18 in the fourth embodiment, it is also possible to form the second displacement detection electrode 82 on the TFT substrate. Also in this case, the base substrate 31 and the adhesive material 40 can be reduced similarly.

DESCRIPTION OF REFERENCE CHARACTERS 1-4: touch panel device, 10: cover panel, 11: front surface, 12: back surface, 13: operation region, 20: adhesive material, 30: touch panel unit, LD: touch position detection layer, 31: base substrate, 32: column electrode, 33: row electrode, 37: detection region, 40: adhesive material, 50: display panel unit, 53: liquid crystal panel, 70: backlight unit, 81, 82A-82H: first displacement detection electrode, 82: second displacement detection electrode, 90, 91: housing, 100: control section, 101: position detection unit, 102: pressing force detection unit, 103: display control unit, 104: operation judgment section, 110: processor, 111: memory, 200: finger.

What is claimed is:

1. A touch panel device comprising:
a cover panel having a front surface including an operation region on which a touch operation is to be performed and a back surface as a surface on a side opposite to the front surface;
a first adhesive material on the back surface:
a touch panel including a base substrate and a plurality of touch sensor electrodes on a region of the base substrate corresponding to the operation region and facing the back surface via the first adhesive, material;
a first displacement detection electrode on a part of the back surface outside a region of the back surface corresponding to the operation region;
a plurality of second displacement detection electrodes on a part of the base substrate outside the region of the base substrate corresponding to the operation region and facing the first displacement detection electrode; and
a pressing force detector to detect pressing force based on capacitance between the first displacement detection electrode and each of the plurality of second displacement detection electrodes, wherein
when the pressing force is applied to the operation region, the capacitance between the first displacement detection electrode and each of the plurality of second displacement detection electrodes changes based on a difference between displacement of the cover panel and displacement of the base substrate,
the plurality of the second displacement detection electrodes include a third displacement detection electrode and a fourth displacement detection electrode that are electrically independent of each other,
the pressing force detector detects the pressing force based on a difference between first capacitance and second capacitance, the first capacitance being capacitance between the first displacement detection electrode and the third displacement detection electrode, the second capacitance being capacitance between the first displacement detection electrode and the fourth displacement detection electrode,
the base substrate has a first surface with the second displacement detection electrode,
the first surface is in a shape having a plurality of corners in a plan view, and
the third displacement detection electrode includes corner electrode parts in vicinal regions of the corners.

2. The touch panel device according to claim 1, wherein capacitance of the plurality of touch sensor electrodes changes when the touch operation is performed on the operation region with an electric conductor.

3. The touch panel device according to claim 2, further comprising a touch position detector to detect a touch position of the touch operation based on the capacitance of the plurality of touch sensor electrodes.

4. The touch panel device according to claim 1, wherein the first displacement detection electrode covers a whole of the plurality of second displacement detection electrodes when the front surface is viewed from a front.

5. The touch panel device according to claim 1, wherein an air layer is between the first displacement detection electrode and the plurality of second displacement detection electrodes.

6. The touch panel device according to claim 1, wherein the fourth displacement detection electrode includes side electrode parts in vicinal regions of sides of the first surface.

7. The touch panel device according to claim 6, wherein when pressing force is applied to the operation region, the first displacement detection electrode is displaced and capacitance between the first displacement detection electrode and the side electrode parts changes.

8. The touch panel device according to claim 1, wherein when pressing force is applied to the operation region, the first displacement detection electrode is displaced and capacitance between the first displacement detection electrode and the corner electrode parts changes.

9. The touch panel device according to claim 8, wherein the pressing force detector detects the pressing force based on a difference which is a value obtained by subtracting change amount of third capacitance from change amount of fourth capacitance, the third capacitance being capacitance between the first displacement detection electrode and the side electrode parts, the fourth capacitance being capacitance between the first displacement detection electrode and the corner electrode parts.

10. The touch panel device according to claim 9, wherein the pressing force detector includes a charge detector to input a drive signal to each second displacement detection electrode of the plurality of second displacement detection electrodes and to detect an electric charge induced in the each second displacement detection electrode.

11. The touch panel device according to claim 1, further comprising a display panel to display an, image that is visible through the touch panel, the first adhesive material and the cover panel.

12. The touch panel device according to claim 11, wherein the display panel includes the base substrate of the touch panel.

13. The touch panel device according to claim 11, further comprising a housing that supports the cover panel, the first adhesive material, the touch panel, and the display panel.

14. The touch panel device according to claim 6, wherein the housing supports the first adhesive material, the touch panel and the display panel by supporting the cover panel.

15. The touch panel device according to claim 1, further comprising:
a plurality of column electrodes; and
a plurality of row electrodes,
wherein the second displacement detection electrodes and respective lead wires are electronically separate from the column and row electrodes of the touch panel device.

* * * * *